US009382359B2

(12) United States Patent
Kanellopoulos et al.

(10) Patent No.: US 9,382,359 B2
(45) Date of Patent: Jul. 5, 2016

(54) REACTOR ASSEMBLY AND METHOD FOR POLYMERIZATION OF OLEFINS

(71) Applicant: BOREALIS AG, Vienna (AT)

(72) Inventors: Vasileios Kanellopoulos, Espoo (FI); Mohammad Al-Haj Ali, Helsinki (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/420,313

(22) PCT Filed: Aug. 26, 2013

(86) PCT No.: PCT/EP2013/002572
§ 371 (c)(1),
(2) Date: Feb. 6, 2015

(87) PCT Pub. No.: WO2014/032794
PCT Pub. Date: Mar. 6, 2014

(65) Prior Publication Data
US 2015/0218295 A1    Aug. 6, 2015

(30) Foreign Application Priority Data

Aug. 29, 2012 (EP) .................................. 12006133

(51) Int. Cl.
C08F 2/00 (2006.01)
B01J 19/00 (2006.01)
(Continued)

(52) U.S. Cl.
CPC .............. C08F 210/16 (2013.01); B01J 8/006 (2013.01); B01J 8/0055 (2013.01); B01J 8/1827 (2013.01); B01J 8/1872 (2013.01); B01J 8/24 (2013.01); B01J 8/388 (2013.01); B01J 19/2465 (2013.01); B01J 2208/00256 (2013.01);
(Continued)

(58) Field of Classification Search
CPC ...... B01J 8/1827; B01J 8/388; B01J 19/2465; B01J 8/0055; B01J 8/006; B01J 8/24; B01J 8/1872; B01J 2208/00256; B01J 2208/00274; B01J 2208/00292; B01J 2208/00672; B01J 2219/00247; B01J 2219/00254; B01J 2208/00752; B01J 2208/00761; B01J 2208/00938; C07F 210/16
USPC ....................................... 526/59, 67; 422/131
See application file for complete search history.

(56) References Cited

U.S. PATENT DOCUMENTS 3,026,186 A * 3/1962 Coty ..................... B01J 8/388
                                                          208/106
4,107,414 A    8/1978 Giannini et al.
(Continued)

FOREIGN PATENT DOCUMENTS

DE    19719481 A1    11/1998
EP    0045975 A2    2/1982
(Continued)

OTHER PUBLICATIONS

International Preliminary Report on Patentability of International Application No. PCT/EP2013/002572 dated Mar. 3, 2015.
(Continued)

Primary Examiner — William Cheung
(74) Attorney, Agent, or Firm — Roberts Mlotkowski Safran & Cole, P.C.

(57) ABSTRACT

Reactor assembly for the production of polymers including a fluidized bed reactor and method for operating the reactor assembly.

13 Claims, 4 Drawing Sheets

(51) Int. Cl.

| | | |
|---|---|---|
| *C08F 210/16* | (2006.01) | |
| *B01J 8/18* | (2006.01) | |
| *B01J 8/38* | (2006.01) | |
| *B01J 19/24* | (2006.01) | |
| *B01J 8/00* | (2006.01) | |
| *B01J 8/24* | (2006.01) | |

(52) U.S. Cl.
CPC ............... *B01J 2208/00274* (2013.01); *B01J 2208/00292* (2013.01); *B01J 2208/00672* (2013.01); *B01J 2208/00752* (2013.01); *B01J 2208/00761* (2013.01); *B01J 2208/00893* (2013.01); *B01J 2208/00938* (2013.01); *B01J 2219/00247* (2013.01); *B01J 2219/00254* (2013.01)

(56) References Cited

U.S. PATENT DOCUMENTS

| | | |
|---|---|---|
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,543,399 A | 9/1985 | Jenkins, III et al. |
| 4,560,671 A | 12/1985 | Gross et al. |
| 4,581,342 A | 4/1986 | Johnson et al. |
| 4,657,882 A | 4/1987 | Karayannis et al. |
| 5,539,067 A | 7/1996 | Parodi et al. |
| 5,618,771 A | 4/1997 | Parodi et al. |
| 5,942,194 A | 8/1999 | Hummel et al. |

FOREIGN PATENT DOCUMENTS

| | | |
|---|---|---|
| EP | 0045976 A2 | 2/1982 |
| EP | 0045977 A2 | 2/1982 |
| EP | 0629631 A2 | 12/1994 |
| EP | 629632 A2 | 12/1994 |
| EP | 0688794 A1 | 12/1995 |
| EP | 699213 B1 | 3/1996 |
| EP | 776913 A2 | 6/1997 |
| EP | 0810235 A2 | 12/1997 |
| EP | 696293 B1 | 5/2000 |
| EP | 1074557 A2 | 2/2001 |
| EP | 1739103 A1 | 1/2007 |
| EP | 1752462 A1 | 2/2007 |
| FR | 1290555 * | 4/1962 |
| FR | 1290555 A | 4/1962 |
| WO | 8707620 A1 | 12/1987 |
| WO | 9219653 A1 | 11/1992 |
| WO | 9219658 A1 | 11/1992 |
| WO | 9219659 A1 | 11/1992 |
| WO | 9221705 A1 | 12/1992 |
| WO | 9311165 A1 | 6/1993 |
| WO | 9311166 A1 | 6/1993 |
| WO | 9319100 A1 | 9/1993 |
| WO | 9425495 A1 | 11/1994 |
| WO | 9512622 A1 | 5/1995 |
| WO | 9532994 A1 | 12/1995 |
| WO | 9632423 A1 | 10/1996 |
| WO | 9704015 A1 | 2/1997 |
| WO | 9728170 A1 | 8/1997 |
| WO | 9736939 A1 | 10/1997 |
| WO | 9812234 A1 | 3/1998 |
| WO | 9832776 A1 | 7/1998 |
| WO | 9840331 A1 | 9/1998 |
| WO | 9912943 A1 | 3/1999 |
| WO | 9933842 A1 | 7/1999 |
| WO | 9942497 A1 | 8/1999 |
| WO | 9951646 A1 | 10/1999 |
| WO | 9961489 A1 | 12/1999 |
| WO | 0026266 A1 | 5/2000 |
| WO | 0029452 A1 | 5/2000 |
| WO | 0155230 A1 | 8/2001 |
| WO | 0179306 A1 | 10/2001 |
| WO | 0187989 A1 | 11/2001 |
| WO | 0202575 A1 | 1/2002 |
| WO | 0202576 A1 | 1/2002 |
| WO | 03000754 A1 | 1/2003 |
| WO | 03000755 A2 | 1/2003 |
| WO | 03000756 A1 | 1/2003 |
| WO | 03000757 A1 | 1/2003 |
| WO | 03010208 A1 | 2/2003 |
| WO | 03051514 A1 | 6/2003 |
| WO | 03051934 A2 | 6/2003 |
| WO | 03106510 A1 | 12/2003 |
| WO | 2004029112 A1 | 4/2004 |
| WO | 2004085499 A2 | 10/2004 |
| WO | 2005118655 A1 | 12/2005 |
| WO | 2007025640 A1 | 3/2007 |
| WO | 2009080660 A1 | 7/2009 |

OTHER PUBLICATIONS

"Gas Fluidization", Perry's Chemicals Engineers' Handbook, McGraw-Hill, 2008, vol. 8, pp. 17-1 to 17-19.
Geldart, "Gas Fluidization Technology," J Wiley & Sons Ltd, 1986, pp. 156-169.
Kirck-Othmer, "Gas Cleaning", Encyclopaedia of Chemical Technology, vol. 10, 2nd Edition, 1966, pp. 340-342.
Stolhandske, "Breaking your lumps: Crushers and how to select one", Powder and Bulk Engineering, 1997, pp. 49-57.
Feldman, "Selecting a lump breaker for gross size reduction", Powder and Bulk Engineering, 1987, pp. 26-29.
International Search Report of International Application PCT/EP2013/002572 mailed Oct. 7, 2013.

* cited by examiner

REACTOR ASSEMBLY AND METHOD FOR POLYMERIZATION OF OLEFINS

This application is a U.S. National Stage Application under 35 U.S.C. Section 371 of International Application No. PCT/EP2013/002572 filed on Aug. 26, 2013, and claims benefit to European Patent Application No. 120061338.8 filed on Aug. 29, 2012.

The invention relates to a fluidized-bed reactor assembly for the polymerisation of olefinic monomer(s), and to multi reactor assemblies comprising at least one fluidized bed reactor. Furthermore, the invention relates to a method of operating and use of such a fluidized-bed reactor assembly.

BACKGROUND

Gas phase reactors are commonly used for the polymerization of olefins such as ethylene and propylene as they allow relative high flexibility in polymer design and the use of various catalyst systems. A common gas phase reactor variant is the fluidized bed reactor. In polyolefin production, olefins are polymerized in the presence of a polymerization catalyst in an upwards moving gas stream. The fluidization gas is removed from the top of the reactor, cooled in a cooler, typically a heat exchanger, re-pressured and fed back into the bottom part of the reactor. The reactor typically contains a fluidized bed comprising the growing polymer particles containing the active catalyst located above a distribution plate separating the bottom and the middle zone of the reactor. The velocity of the fluidization gas is adjusted such that a quasi-stationary situation is maintained, i.e. the bed is maintained at fluidized conditions. In such a quasi-stationary situation, the gas and particle flows are highly dynamic. The required gas velocity mainly depends on the particle characteristics and is well predictable within a certain scale range. Care has to be taken that the gas stream does not discharge too much polymeric material from the reactor. This is usually accomplished by a so called disengagement zone. This part in the upper zone of the reactor is characterized by a diameter increase, reducing the gas velocity. Thereby the particles that are carried over from the bed with the fluidization gas for the most part settle back to the bed. Yet another fundamental problem with traditional fluidized bed reactors are the limitations as to the cooling capacity and entrainment due to the formation of huge bubbles. It should be mentioned that the presence of bubbles as such is desirable, since mixing is intensified thereby. However, bubble size should be much smaller than the diameter of the reactor. Increasing the bed level in conventional fluidized bed reactors for increasing the space-time yield leads to an increase of the bubble size and to an unwanted entrainment of material from the reactor. In conventional reactors there are no means for breaking up the bubbles.

Various modified gas phase reactor designs have been proposed. For example, WO-A-01/87989 has proposed a fluidized bed reactor without a distribution plate and an asymmetric supply of the reaction components to the reaction chamber.

Dual reactor assemblies comprising two reactors are also known. WO 97/04015 discloses two coupled vertical cylindrical reactors, the first reactor being operated under fast fluidization conditions. The first reactor having a frustoconical bottom zone and a hemispherical upper zone is coupled with the second reactor being a settled bed reactor. The operation under fast fluidization conditions is done in a reactor having a ratio of length/equivalent cross-sectional diameter of about 5 or more.

WO-A-01/79306 discloses a gas phase reactor assembly comprising a reactor including a distribution grid coupled with a cyclone separating solids and gaseous material. The separated solids are recycled back to the reactor.

WO-A-2009/080660 reports the use of a gas phase reactor assembly as described in WO-A-97/04015 comprising two interconnected reactors and a separation unit, the first reactor being a so called riser and the second reactor being a so called downcomer. The first reactor is operated under fast fluidization conditions.

However, the fluidized bed reactors and the dual reactor assemblies comprising a fluidized bed reactor described in the prior art still have several disadvantages.

A first problem concerns the plugging of the underside of the distribution plates due to entrainment of fines carried over with the circulation gas. This effect lowers operational stability and stability of the quality of the polymer. This problem partially can be overcome by lower fluidization gas velocity. However, a relatively low fluidization gas velocity limits the production rate and can lead to the formation of sheets, chunks and lumps in the production of polyolefins. This conflict of aims usually has been countered by the incorporation of a disengagement zone. However, disengagement zones again limit the production rate of a gas phase reactor of fixed size, as there is the need for additional top space above the top level of the fluidized bed during operation. In industrial dimensions, the volume of the disengagement zone often amounts to more than 40% of the total volume of the reactor and insofar requires the construction of unnecessary huge reactors.

A second problem concerns the bubbling. Conventional fluidized bed reactors typically operate in a bubbling regime. A part of the fluidization gas passes the bed in the emulsion phase where the gas and the solids are in contact with each other. The remaining part of the fluidization gas passes the bed in the form of bubbles. The velocity of the gas in the bubbles is higher than the velocity of the gas in the emulsion phase. Further, the mass and heat transfer between the emulsion phase and the bubbles is limited, especially for large bubbles having a high ratio of volume to surface area. Despite the fact that the bubbles positively contribute to powder mixing, formation of too large bubbles is undesired because the gas passing through the bed in the form of bubbles does not contribute to the heat removal from the bed in the same way as the gas in the emulsion phase and the volume occupied by the bubbles does not contribute to the polymerization reaction.

Yet a further problem concerns the entrainment of solids containing fines when removing the fluidization gas from the top of the reactor. Especially when operating the fluidized bed reactor with the bed level close to the roof of the reactor significant solid entrainment occurs. However, the presence of solids in the fluidization gas negatively affects the downstream units like compressors, heat exchangers, etc. Therefore, means are used to separate solids from the fluidization gas like for instance cyclones. Cyclones operate by taking advantage of the higher mass of the solids compared to the gas. Accordingly separation efficiency of the cyclone deteriorates with a decreasing mass of the solids. In other words increased amount of fines, i.e. small solid particles with a small mass, entrained from the reactor deteriorate cyclone efficiency as they are less efficiently removed by the cyclone than the larger fraction of the entrained solids.

Thus there is still the need for improved reactor design and operation. The present invention aims to overcome the disadvantages of the reactor designs known in the prior art and particularly aims to avoid the segregation of fines at a high production rate. The present invention further aims to increase the efficiency of separating solids from gas. The present invention further aims at avoiding low productivity zones in the reactor. Moreover, the present invention concerns the provision of a reactor, allowing high operational stability and at the same time production of polymer having highest quality.

SUMMARY OF THE INVENTION

The present invention is based on the finding that these problems can be overcome by a fluidized bed reactor assembly allowing for variation of the amount of solids containing fines being recycled to the fluidized bed reactor and/or varying the operation condition of the reactor.

The present invention insofar provides a reactor assembly for the production of polymers including a fluidized bed reactor (1) comprising a bottom zone (5), a middle zone (6) and an upper zone (7), one or more outlets (9) for fluidization gas streams (34) located in the upper zone (7), gas/solid separation means (2), a flow through device (29), a solid recycling line (35), a solid recycling inlet (37), a gas circulation line (38), an inlet (8) for fluidization gas located in the bottom zone (5);

the outlet (9) for the fluidization gas stream (34) being coupled with the fluidized bed reactor (1) via gas/solid separation means (2), gas circulation line (38) and inlet (8) and via solid recycling line (35), gas/solid separation means (2) and solid recycling inlet (37);

the equivalent cross-sectional diameter of the bottom zone (5) being monotonically increasing with respect to the flow direction of the fluidization gas through the fluidized bed reactor;

the equivalent cross-sectional diameter of the upper zone (7) being monotonically decreasing with respect to the flow direction of the fluidization gas through the fluidized bed reactor; and wherein there is an unobstructed passageway in the direction of flow of the fluidization gas through the fluidized bed reactor from the bottom zone (5) to the upper zone (7), characterized in that the solid recycling line (35) includes the flow through device (29).

The present invention further provides a method for operating a reactor assembly for the production of polymers including a fluidized bed reactor comprising a bottom zone (5), a middle zone (6) and an upper zone (7), one or more outlets (9) for fluidization gas streams (34) located in the upper zone (7), gas/solid separation means (2), a flow through device (29), a solid recycling line (35), a solid recycling inlet (37), a gas circulation line (38), an inlet (8) for fluidization gas located in the bottom zone (5) and a controller (31), the method comprising the steps of:
a) measuring the mean particle size and/or the particle size distribution and/or the concentration of all solids of an fluidization gas stream (34) from the fluidized bed reactor (1);
b) analyzing the operating conditions in the fluidized bed reactor (1);
c) sending the data (30) obtained in steps a) and b) to a controller (31);
d) processing the data (30) by the controller (31); and
e) adjusting the flow through device (29) by the controller (31);
whereby the flow through device (29) varies the solid recycling stream (36) via solid recycling line (35) back to the fluidized bed reactor (1).

Usually, the mean particle size and/or the particle size distribution and/or the concentration of all solids of the fluidization gas stream (34) is determined prior to the gas/solid separation means.

The present invention further is directed to a method for polymerizing olefins in a fluidized bed reactor (1), wherein the fluidized bed is formed by polymer particles in an upwards rising fluidization gas said upwards rising fluidization gas has a superficial velocity in the middle zone (6) of from 0.05 to 0.8 m/s, said method comprising the steps of:
(i) withdrawing a fluidization gas stream (34) via outlet (9) from said fluidized bed reactor (1) at a height of more than 90% of the total height of said fluidized bed reactor (1);
(ii) separating the polymer particles from said fluidization gas stream (34) to produce an overhead stream (42) and a solid recycling stream (36);
(iii) branching off from said solid recycling stream (36) a stream to downstream process stages (40);
(iv) directing said stream to downstream process stages (40) to downstream process stages; and
(v) recycling the solid recycling stream (36) into said fluidized bed reactor (1);
wherein said fluidized bed reactor (1) comprises a bottom zone (5), a middle zone (6) and an upper zone (7), the equivalent cross-sectional diameter of the bottom zone (5) being monotonically increasing with respect to the flow direction of the fluidization gas through the fluidized bed reactor and the equivalent cross-sectional diameter of the upper zone (7) being monotonically decreasing with respect to the flow direction of the fluidization gas through the fluidized bed reactor; and wherein there is an unobstructed passageway in the direction of flow of the fluidization gas through the fluidized bed reactor from the bottom zone (5) to the upper zone (7).

Preferably, the fluidized bed reactor is part of the reactor assembly according to the present invention.

The present invention further is directed to the use of a controller (31), a flow through device (29) and a solid recycling line (35) in a reactor assembly for the production of polymers including a fluidized bed reactor (1) comprising a bottom zone (5), a middle zone (6) and an upper zone (7), one or more outlets (9) for fluidization gas streams (34) located in the upper zone (7), gas/solid separation means (2), a solid recycling line (35), a solid recycling inlet (37), a gas circulation line (38), an inlet (8) for fluidization gas located in the bottom zone (5) and an outlet for the polymer (14) for minimizing the mass fraction of fines with respect to the solids contained in the fluidization gas streams (34).

The present invention further is directed to the use of a controller (31), a flow through device (29) and a solid recycling line (35) in a reactor assembly for the production of polymers for minimizing the amount of fines produced by the fluidized bed reactor (1), the reactor assembly including a fluidized bed reactor comprising a bottom zone (5), a middle zone (6) and an upper zone (7), one or more outlets (9) for fluidization gas streams (34) located in the upper zone (7), gas/solid separation means (2), a flow through device (29), a solid recycling line (35), a solid recycling inlet (37), a gas circulation line (38), an inlet (8) for fluidization gas located in the bottom zone (5) and a controller (31).

The description of the method according to the present invention applies to all embodiments of the invention.

The reactor assembly preferably further comprises a controller (31).

DETAILED DESCRIPTION OF THE INVENTION

Definitions

An overview of different types of fluidization and different fluidization regimes is given, for instance, in section 17 of Perry's Chemical Engineers' Handbook, vol. 8 (McGraw-Hill, 2008). FIG. 17-3 in Perry's shows that conventional bubbling fluidized beds typically operate at superficial gas velocities between the minimum fluidization velocity and the terminal velocity. The turbulent beds operate at a gas velocity being close to the terminal velocity. The transport reactors and circulating beds operate at gas velocities significantly higher than the terminal velocity. Bubbling, turbulent and fast fluidized beds are clearly distinguishable and they are explained in more detail in Perry's, on pages 17-9 to 17-11 incorporated by reference herewith. Calculation of minimum fluidization velocity and transport velocity is further discussed in Geldart. Gas Fluidization Technology, page 155, et seqq, J Wiley & Sons Ltd, 1986. This document is incorporated by reference.

Fluidized bed reactors are well known in the prior art. In fluidized bed reactors the fluidization gas is passed through the fluidized bed within a certain superficial velocity. The superficial velocity of the fluidization gas must be higher than the fluidization velocity of the particles contained in the fluidized bed as otherwise no fluidization would occur. However, the superficial velocity should be substantially lower than the onset velocity of pneumatic transport, as otherwise the whole bed would be entrained with the fluidization gas. Reactors operating in transport regime exist. Such operation is commonly referred to as fast fluidization or fast fluidized beds. An overview is given, for instance, in Perry's, pages 17-1 to 17-12, or M Pell, Gas Fluidization (Elsevier, 1990), pages 1 to 18 and in Geldart, Gas Fluidization Technology, J Wiley & Sons Ltd, 1986.

Solids and fines according to the present invention are both particles. In particular, solids and fines according to the present invention are polymer particles. Furthermore, the term solids as used in the present application comprises the fines. According to the present invention fines are defined as solids having a mean particle size and/or particle size distribution (PSD) of less than a defined threshold value, i.e, below that threshold value solids are considered as fines. Where the threshold value is set depends on the polymer grade as well as on the density of the polymer. However, typically solids with a particle size ($d_p$) of less than 100 μm, preferably, less than 80 μm, more preferably less than 50 μm are defined as fines.

Particle size distribution may be characterized, by indicating, both, the median particle size and the span of the particle size distribution. The span is usually defined as $(d_{p,90}-d_{p,10})/d_{p,50}$, where $d_{p,90}$ is the particle size for which 90% by the weight of the particles have a diameter which is smaller than $d_{p,90}$; $d_{p,10}$ is the particle size for which 10% by the weight of the particles have a diameter which is smaller than $d_{p,10}$; and $d_{p,50}$ is the median particle size for which 50% by the weight of the particles have a diameter which is smaller than $d_{p,50}$.

The gas/solid separation means (2) allow separation of gas and solids. In the simplest embodiment this can be a vessel where the solids, particularly polymer particles settle by gravity. Usually the means for gas/solids separation comprise at least one gas/solid separation unit which is preferably a cyclone. A cyclone in its simplest form is a container in which a rotating flow is established. Cyclone design is well described in the literature. Particularly suitable cyclones are described in documents Kirk-Othmer, Encyclopaedia of Chemical Technology, $2^{nd}$ edition (1966), Volume 10, pages 340-342 being incorporated by reference herewith. The gas/solid separation means usually contains four gas/solid sepratation units or less.

The solid filter means (41) also separates solids from gas. The solid filter means is optionally present in the reactor assembly according to the present invention in addition to the gas/solid separation means. Typically solid filter means are knock-out drums. The solid filter means are not comprised in the term gas/solid separation means. Accordingly, restriction of the present invention to only one gas/solid separation unit in the gas/solid separation means does not exclude the additional presence of the solid filter means (41) in the reactor assembly.

The flow through device (29) allows for varying the amount of a stream of particles, gas or fluid or mixtures thereof flowing through the device. The variation occurs by adjusting the flow through device. Thereby the flow through device lets pass 0 to 100% of a stream in a certain direction. Furthermore, the flow through device may additionally allow for passing the rest 100 to 0% of the stream in at least one additional direction. Furthermore, the flow through device (29) is preferably capable of sending and/or receiving signals to/from the controller (31).

Usually the flow through device comprises a valve. Particularly, the valve can be a one-way valve or a multiport valve. Various valve designs are well known in the art.

A controller (31) is any kind of device allowing for receiving and processing data and receiving and sending signals. Usually the controller is a computer.

The fluidization gas stream of the present invention comprises fluidization gas and may also comprise different amounts of solids. Accordingly, the word "gas" does not necessarily exclude that further components beside fluidization gas may be comprised in the fluidization gas stream. However, the amount and nature of solids comprised in the fluidization gas stream (34) and the gas circulation line varies and depends, among others, on where the content of solids is measured in the reactor assembly, as additional process steps are effected on the stream, the operating conditions of the fluidized bed reactor and the nature (e.g. density) of the polymer produced in the reactor. For instance, in the fluidization gas stream (34) in outlet line (33) more solids are contained than in the fluidization gas stream in gas circulation line (38), at the exit of the gas/solid separation means.

Means for cooling (3) are required in view of the exothermic nature of the polymerization reactions. Usually the means for cooling will be in the form of a heat exchanger.

Means for pressurizing (4) enable the adjustment of the fluidization gas velocity. They are typically compressors.

The fluidized bed reactor comprises a bottom zone (5), a middle zone (6) and an upper zone (7). These zones form the actual reaction zone denoting the room within the fluidized bed reactor designated for the polymerization reaction. However, one skilled in the art will understand that the polymerization reaction will go on as long as the catalyst remains active and there is monomer to polymerize. Thus chain growths can also occur outside the actual reaction zone. For example, polymer collected in a collection vessel will still polymerize further.

The terms bottom-, middle- and upper zone indicate the relative position with respect to the base of the fluidized bed reactor. The fluidized bed reactor vertically extends in upward direction from the base, whereby the cross-section(s) of the fluidized bed reactor are essentially parallel to the base.

The height of the fluidized bed reactor is the vertical distance between two planes with the lower plane crossing the lowest point of the bottom zone and the upper plane crossing the highest point of the upper zone. The vertical distance denotes the distance along a geometrical axis forming a 90° angle with the base and also the two planes, i.e. a gas entry zone (if present) shall as a matter of definition contribute to the height of the fluidized bed reactor. The height of the individual zones is the vertical distance between the planes limiting the zones.

The term cross-section as used herein denotes the area of the intersection with a plane being parallel to the base. If not mentioned otherwise, the term cross-section always concerns the inner cross-section without internals. For example if the middle zone is cylindrical having an outer diameter of 4.04 m and the wall of the cylinder has a thickness of 0.02 m, the inner diameter will be 4.00 m, whereby the cross-section will be $2.0 \times 2.0 \times \pi$ m$^2 \approx 12.6$ m$^2$.

The term free cross-section denotes the area of the total cross-section allowing interchange of gases and particles. In other words, in a sectional drawing with the section going through the plane formed by the interphase plane of the cross-section of the bottom zone and the cross-section of the middle zone, the free cross-section is the area, which is unobstructed.

Having an essentially constant equivalent cross-sectional diameter denotes an equivalent cross-sectional diameter having a variation of below 5%.

Variation shall mean the difference of the equivalent cross-sectional diameter maximum and the equivalent cross-sectional diameter minimum versus the average equivalent diameter. For example, if the maximum equivalent cross-sectional diameter was 4.00 m, the minimum equivalent cross-sectional diameter was 3.90 m, and the average equivalent cross-sectional diameter was 3.95 m variation would be (4.00−3.90) m/3.95 m=0.025, i.e. 2.5%.

Monotonically decreasing is to be understood in a mathematical sense, i.e. the average diameter will decrease or will be constant with respect to the flow direction of the fluidization gas through the fluidized bed reactor. Monotonically decreasing equivalent cross-sectional diameter includes two situations namely the decrease of the equivalent cross-sectional diameter with respect to the flow direction of the fluidization gas through the fluidized bed reactor and also constancy of the equivalent cross-sectional diameter with respect to the flow direction of the fluidization gas. It should be understood, however, that even though a zone having a monotonically decreasing diameter in the direction of flow may have sections having an essentially constant diameter, the diameter at the downstream end of the zone is always smaller than the diameter at the upstream end of the zone.

By "strictly monotonically decreasing" it is meant that the equivalent cross-sectional diameter will decrease with respect to the flow direction of the fluidization gas through the fluidized bed reactor. Thus, if a zone has a strictly monotonically decreasing diameter in the direction of flow then at any point h of the zone the diameter is smaller than at any other point upstream of said point h.

The phrases "monotonically increasing" and "strictly monotonically increasing" are to be understood correspondingly.

Equivalent cross-sectional diameter is the normal diameter in case of circular cross-section. If the cross-section is not circular, the equivalent cross-sectional diameter is the diameter of a circle having the same area as the cross-section of the non-circular cross-section embodiment.

As a matter of definition, the three reaction zones, bottom zone, middle zone and upper zone shall differentiate as to their equivalent cross-sectional diameter. In other words, the boundary plane delimiting bottom zone and middle zone shall be the plane, where the cross-sectional diameter changes from increasing values to essentially constant values. The boundary plane delimiting middle zone and upper zone shall be the plane, where the cross-sectional diameter changes from essentially constant values to decreasing values. In the subsequent text "diameter" is also used in the meaning of "equivalent cross-sectional diameter" for non-circular surfaces.

Cone geometry plays an important role for the present invention. A cone is a three-dimensional geometric shape that tapers smoothly from a flat to the apex. This flat usually will be a circle but may also be elliptic. All cones also have an axis which is the straight line passing through the apex, about which the lateral surface has a rotational symmetry.

From a more functional perspective, the fluidized bed reactor according to the present invention includes a gas entry section, a first domain, wherein the superficial gas velocity of the fluidization gas is essentially constant, and a second domain being located above the first domain, wherein the superficial gas velocity of the fluidization gas is higher relative to the first domain, an inlet for the fluidization gas located in the gas entry section, an outlet for the fluidization gas located in the second domain; the outlet for the fluidization gas being coupled with the fluidized bed reactor via a gas circulation line; and means for separation of solids from gas being connected to said gas circulation line.

Gas entry section denotes the part of the whole apparatus, where the feed takes place and the bed is formed. The gas entry section insofar differentiates from the so called first domain and second domain.

The first domain denotes the part of the fluidized bed reactor, where the superficial gas velocity of the fluidization gas is essentially constant.

The second domain is located vertically above the first domain and denotes the part of the fluidized bed reactor, where the superficial gas velocity of the fluidization gas is higher than in the superficial gas velocity in the first domain.

Gas velocity shall mean the superficial gas velocity.

DESCRIPTION

The new reactor assembly has various advantages. In a first aspect, there is no disengagement zone. This leads to an economical construction. The reactor can be operated so that the bed occupies almost the total volume of the reactor. This enables higher output/reactor size ratios further leading to substantial cost reduction. Further the polymer is evenly distributed within the reactor over the bed area and is accompanied by better coalescence of gas bubbles. It further has been surprisingly found that the solids flow vicinal to the walls of the reactor is high which leads to a constant cleaning of the walls particularly in the upper zone. In another aspect, it has been surprisingly found that within the reactor assembly the entrainment of fines with the fluidization gas is reduced as the undesirably large bubbles are destroyed. Further, the heat removal from the polymer as a function of bed height is more even and there is a better dispersion between the gas and the polymer as in the prior art reactors and processes.

A further important advantage of the present invention is that the separation of the polymer from the fluidization gas, for instance by using one or more cyclone(s), can easily be done due to a high concentration of solids in the fluidization gas. It has been surprisingly found that the solids content in the fluidization gas after the gas/solid separation is much lower in the present invention compared with a plant/process resulting in a feed to the gas/solids separation means characterized by a lower amount of solids. In other words, the relatively high amount of solids before the gas/solid separation in the present invention surprisingly results to a better degree of separation of solids.

A further important advantage of the present invention is that the separation of the polymer from the fluidization gas, for instance by using one or more cyclone(s), can easily be done since the weight fraction of fines contained in the solids is reduced. As defined above fines are solids of a size below defined threshold. The fines have a very small mass due to their small size. The efficiency of the gas/solid separation means increases with the mass of particles to be separated from the gas. For example, a cyclone acts by taking advantage of centrifugal forces its efficiency increases with the mass of particles to be separated from the gas. It has been surprisingly found that the amount of fines is low produced in the fluidized bed reactor according to the present invention.

Moreover, a narrow particle size distribution (PSD) automatically reduces the amount of fines as the threshold for fines practically is significantly away from the typical maximum of a (narrow) particle size distribution curve.

Furthermore, the mean particle size is simultaneously increased associated with an increasing mean mass of the particles. It has been surprisingly found that the recycling of solids, especially fines back to the fluidized bed reactor the mean particle size is enlarged.

Consequently a reduced amount of fines is entrained to the cyclone resulting in an increased efficiency of the cyclone, i.e. an even better degree of separation of solids from gas due to the present invention. In other words, the fluidized bed reactor and the gas/solid separation means, e.g. one or more cyclone(s), contribute to the solution in a synergistic way.

It is preferred that the reactor assembly according to the present invention comprises an inlet for the catalyst or catalyst containing prepolymer. In the simplest embodiment, the catalyst or catalyst containing prepolymer may be fed via the inlet for the fluidization gas. However, a separate inlet for the catalyst or catalyst containing prepolymer allows good mixing of the catalyst into the bed. Most preferably the catalyst is fed to the most turbulent zone.

In one embodiment, the reactor assembly according to the present invention preferably comprises an outlet for the removal of sheets, chunks and lumps. Though the formation rate for sheets, chunks and lumps is extremely low, it is not possible to suppress the formation thereof to zero under all reaction conditions. If present the outlet for the removal of sheets, chunks and lumps will be preferably located in the lowest part of the bottom zone. In the most preferred embodiment, the outlet will be positioned in the centre of the bottom zone. When the bottom zone has conical shape, the outlet will preferably fall together with the apex of the cone.

In a second embodiment, the outlet for the removal of sheets, chunks and lumps is accompanied by means for the break-up of sheets, chunks and/or lumps. Such means for break-up of sheets, chunks and/or lumps are commercially available and they are discussed, among others, in Stolhandske, Powder and Bulk Engineering, July 1997 issue on pages 49-57 and Feldman, Powder and Bulk Engineering, June 1987 issue on pages 26-29 both documents being incorporated by reference herewith.

As explained above, the fluidized bed reactor according to the present invention comprises three zones, a bottom zone (5), a middle zone (6) and an upper zone (7).

In a first and preferred embodiment the fluidized bed reactor according to the present invention consists of three zones, a bottom zone (5), a middle zone (6) and an upper zone (7).

In a second embodiment, the fluidized bed reactor according of the present invention comprises more than three zones, a bottom zone (5), a middle zone (6) and an upper zone (7) and at least one additional zone, whereby this at least one additional zone is located below the bottom zone (5) with respect to the flow direction of the fluidization gas.

The following applies to all embodiments of the invention.

The equivalent cross-sectional diameter of the upper zone preferably is strictly monotonically decreasing with respect to the flow direction of the fluidization gas, i.e. generally in upwards vertical direction.

The middle zone of the fluidized bed reactor typically will be in the form of a circular cylinder being denoted herein simply cylinder. However, it is possible that the middle zone of the fluidized bed reactor is in the form of an elliptic cylinder. Then the bottom zone preferably is preferably in the form an oblique cone. Then more preferably the upper zone is also in the form of an oblique cone.

From a more functional perspective, the middle zone will essentially form the first domain wherein the superficial gas velocity of the fluidization gas is essentially constant. The upper zone will essentially form the second domain wherein the superficial gas velocity of the fluidization gas is higher relative to the first domain.

The upper zone of the reactor assembly according to the present invention is preferably shaped such that a gas-particle stream vicinal to the inner walls is created, whereby the gas-particle stream is directed downwards to the base. This gas-particle stream leads to an excellent particle-gas distribution and to an excellent heat balance. Further the high velocity of the gas and particles vicinal to the inner walls minimizes lump- and sheet formation.

It is further preferred that the ratio of the height of the upper zone to the diameter of the middle zone is within the range of from 0.3 to 1.5, more preferably 0.5 to 1.2 and most preferably 0.7 to 1.1.

It is particularly preferred that the reactor assembly according to the present invention includes an upper zone being cone-shaped and a middle zone being cylindrical shaped. The cone forming the upper zone preferably is a right circular cone and the cylinder forming the middle zone preferably is a circular cylinder.

More preferably the cone-angle of the cone-shaped upper zone is 10° to 50°, most preferably 20 to 40°. As defined above, the cone-angle is the angle between the axis of the cone and the lateral area (FIG. 3).

The specific cone-angles of the cone-shaped upper zone further improve the tendency for back-flow of the particles countercurrent to the fluidization gas. The resulting unique pressure balance leads to an intensive break up of bubbles, whereby the space-time-yield is further improved. Further as mentioned above, the wall flow velocity, i.e., the velocity of particles and gas vicinal to the inner walls is high enough to avoid the formation of lumps and sheets.

The reactor assembly according to the present invention preferably has a bottom zone shaped such that the particles distribute the gas over the whole cross-section of the bed. In other words, the particles act as a gas distribution grid. In the bottom zone gas and solids are mixed in highly turbulent conditions. Because of the shape of the zone, the gas velocity gradually decreases within said bottom zone and the conditions change so that a fluidized bed is formed.

The following specifically preferred reactor geometries can be combined with the aforementioned first embodiment consisting of three zones a bottom zone (5), a middle zone (6) and an upper zone (7) and the second embodiment including at least one additional zone, whereby this zone or these zones is/are located below the bottom zone.

Preferably, the equivalent cross-sectional diameter of the bottom zone (5) is monotonically increasing with respect to the flow direction of the fluidization gas through the fluidized bed reactor. As the flow direction of the fluidization gas is upwards with respect to the base, the equivalent cross-sectional diameter of the bottom zone is vertically monotonically increasing. Monotonically increasing is to be understood in a mathematical sense, i.e. the average diameter will increase or will be constant with respect to the flow direction of the fluidization gas through the fluidized bed reactor.

The equivalent cross-sectional diameter of the bottom zone preferably is strictly monotonically increasing with respect to the flow direction of the fluidization gas through the reactor, i.e. generally vertically upwards.

More preferably, the bottom zone is cone-shaped and the middle zone is cylindrical shaped.

The bottom zone preferentially has right circular cone shape and the middle zone is in the form of a circular cylinder. Alternatively the middle zone is in the form of an elliptic cylinder and the bottom and the upper zone are in the form oblique cones.

More preferably, the cone-angle of the cone-shaped bottom zone is 5° to 30°, even more preferably 7° to 25° and most preferably 9° to 18°, whereby the cone-angle is the angle between the axis of the cone and the lateral surface (FIG. 2).

It is further preferred that the equivalent diameter of the bottom zone increases from about 0.1 to about 1 meters per one meter of height of the bottom zone (m/m). More preferably, the diameter increase from 0.15 to 0.8 m/m and in particular from 0.2 to 0.6 m/m.

The preferred cone-angles lead to additional improved fluidization behaviour and avoid the formation of stagnant zones. As a result, the polymer quality and stability of the process are improved. Especially, a too wide cone-angle leads to an uneven fluidization and poor distribution of the gas within the bed. While an extremely narrow angle has no detrimental effect on the fluidization behaviour it anyway leads to a higher bottom zone than necessary and is thus not economically feasible.

However, as mentioned above, in a second embodiment, there is an at least one additional zone being located below the bottom zone. It is preferred that the at least one additional zone, or if there is more than one additional zone, the total of the additional zones contributes/contribute to a maximum of 15% to the total height of the reactor, more preferably 10% to the total height of the reactor and most preferably less than 5% of the total height of the reactor. A typical example for an additional zone is a gas entry zone.

Preferably, there is an unobstructed passageway in the direction of flow of the fluidization gas through the fluidized bed reactor between the bottom zone (5) and the upper zone (7). An unobstructed passageway includes all geometries which allow substantially free exchange of gas and particles between and within said zones. An unobstructed passageway is characterized by the absence of internals such as distribution plates and/or grids resulting in substantially increased flow resistivity. Accordingly, the fluidized bed reactor (1) of the present invention preferably comprises no gas distribution grid and/or plates. An unobstructed passageway is characterized by a ratio of the free cross-section/total cross-section with respect to the partition between the bottom zone and the middle zone of at least 0.95, whereby the free cross-section is the area allowing interchange of gases and whereby the total cross-section is the area of the inner reactor cross section limited by the walls of the fluidized bed reactor.

This shall be explained by way of an example. When the middle zone has cylindrical form with an inner diameter of 4 meter, the total cross-section is about $2.0 \times 2.0 \times \pi \, m^2 \approx 12.6 \, m^2$. If the area of the free cross-section, i.e. the area allowing interchange of gases is at least 12.0 m² the criteria for an unobstructed passageway will be fulfilled. A typical example for an internal leading to a small reduction as to the cross-section allowing interchange of gases and solids is a vertical pipe. Such a pipe or a plurality of pipes directs flow and insofar has guiding function. However, as the wall thickness of the pipe (and fasteners) only limit the cross-section to a very small degree, the interchange of gases and solids will be essentially not limited.

The fluidized bed reactor assembly according to the present invention can be used for producing polymers in a commercial scale, for instance with a production capacity of from 2 to 40 tons per hour or 10 to 30 tons per hour.

The reactor assembly according to the present invention preferably includes means for injection of the fluidization gas with an injection angle within the range of 120° to 150° with respect to the vertical axis of the fluidized bed reactor. The vertical axis forms a 90° angle with the base. More preferably the means for injection of the fluidization gas enable an injection angle in the range of 130° to 140°.

Moreover the reactor assembly according to the present invention preferably comprises an outlet for the polymer. In the simplest variant of the reactor assembly, the polymer can be withdrawn via the fluidization gas stream and the gas/solid separation means, e.g. the one or more cyclone(s).

The outlet for the polymer preferably is located in the middle zone. More preferably the outlet is in the form of a nozzle. Typically there will be numerous nozzles located in the middle zone.

Advantageously, at least a part of the polymer is withdrawn directly from the fluidized bed, meaning that the outlet nozzle withdraws polymer from a level which is above the base of the fluidized bed but below the upper level of the fluidized bed. Hence, the outlet nozzles for withdrawing polymer are located in the middle zone of the reactor. It is preferred to withdraw the polymer continuously, as described in WO 00/29452. It is then also possible to withdraw a part of the polymer via the fluidization gas stream and the gas/solid separation means, e.g. the one or more cyclone(s). The polymer obtained directly from the fluidized bed and the polymer obtained via the fluidization gas stream and the gas/solid separation means are then usually combined.

The circulation gas is cooled in order to remove the heat of polymerization. Typically, this is done in a heat exchanger. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543, 399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

When producing olefin polymers in the presence of olefin polymerization catalysts the superficial gas velocity in the middle zone of the reactor is suitably within a range of from 5 to 80 cm/s (or, from 0.05 to 0.8 m/s), preferably from 0.07 to 0.7 m/s, such as 0.1 to 0.5 m/s or 0.3 m/s or 0.2 m/s or 0.1 m/s.

The reactor may be used for polymerizing monomers in the presence of a polymerization catalyst. Monomers which can thus be polymerized include olefins, diolefins and other polyenes. The reactor may thus be used to polymerize ethylene, propylene, 1-butene, 1-pentene, 1-hexene, 4-methyl-1-pentene, 1-heptene, 1-octene, 1-decene, styrene, norbornene, vinyl norbornene, vinylcyclohexane, butadiene, 1,4-hexadiene, 4-methyl-1,7-octadiene, 1,9-decadiene and their mixtures. Especially, the reactor is useful in polymerizing ethylene and propylene and their mixtures, optionally together with other alpha-olefin comonomers having from 4 to 12 carbon atoms.

In addition to the monomers different co-reactants, adjuvants, activators, catalysts and inert components may be introduced into the reactor.

Any polymerization catalyst may be used to initiate and maintain the polymerization. Such catalysts are well known in the art. Especially the catalyst should be in the form of a particulate solid on which the polymerization takes place. Suitable catalysts for olefin polymerization are, for instance, Ziegler-Natta catalysts, chromium catalysts, metallocene catalysts and late transition metal catalysts. Also different combinations of two or more such catalysts, often referred to as dual site catalysts, may be used.

Examples of suitable Ziegler-Natta catalysts and components used in such catalysts are given, for instance, in WO-A-87/07620, WO-A-92/21705, WO-A-93/11165, WO-A-93/11166, WO-A-93/19100, WO-A-97/36939, WO-A-98/12234, WO-A-99/33842, WO-A-03/000756, WO-A-03/000757, WO-A-03/000754, WO-A-03/000755, WO-A-2004/029112, WO-A-92/19659, WO-A-92/19653, WO-A-92/19658, U.S. Pat. No. 4,382,019, U.S. Pat. No. 4,435,550, U.S. Pat. No. 4,465,782, U.S. Pat. No. 4,473,660, U.S. Pat. No. 4,560,671, U.S. Pat. No. 5,539,067, U.S. Pat. No. 5,618,771, EP-A-45975, EP-A-45976, EP-A-45977, WO-A-95/32994, U.S. Pat. No. 4,107,414, U.S. Pat. No. 4,186,107, U.S. Pat. No. 4,226,963, U.S. Pat. No. 4,347,160, U.S. Pat. No. 4,472,524, U.S. Pat. No. 4,522,930, U.S. Pat. No. 4,530,912, U.S. Pat. No. 4,532,313, U.S. Pat. No. 4,657,882, U.S. Pat. No. 4,581,342, U.S. Pat. No. 4,657,882, EP-A-688794, WO-A-99/51646, WO-A-01/55230, WO-A-2005/118655, EP-A-810235 and WO-A-2003/106510.

Examples of suitable metallocene catalysts are shown in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462, EP-A-1739103, EP-A-629631, EP-A-629632, WO-A-00/26266, WO-A-02/002576, WO-A-02/002575, WO-A-99/12943, WO-A-98/40331, EP-A-776913, EP-A-1074557 and WO-A-99/42497, The catalysts are typically used with different activators. Such activators are generally organic aluminium or boron compounds, typically aluminium trialkyls, alkylaluminium halides, alumoxanes In addition different modifiers, such as ethers, alkoxysilanes, and esters and like may be used.

Further, different coreactants, may be used. They include chain transfer agents, such as hydrogen and polymerization inhibitors, such as carbon monoxide or water. In addition, an inert component is suitably used. Such inert component may be, for instance, nitrogen or an alkane having from 1 to 10 carbon atoms, such as methane, ethane, propane, n-butane, isobutane, n-pentane, isopentane, n-hexane or like. Also mixtures of different inert gases may be used.

The polymerization is conducted at a temperature and pressure where the fluidization gas essentially remains in vapour or gas phase. For olefin polymerization the temperature is suitably within the range of from 30 to 110° C., preferably from 50 to 100° C. The pressure is suitably within the range of from 1 to 50 bar, preferably from 5 to 35 bar.

The reactor is preferably operated in such conditions that the bed occupies at least 70% of the combined volume of the middle zone and the upper zone, more preferably at least 75% and most preferably at least 80%. The same numbers hold for the inventive processes according to the present invention. When the reactor is operated in this manner it has been found that surprisingly the bubbles break up at the upper part of the reactor or are prevented from growing. This is advantageous for a number of reasons. First, when the volume occupied by the bubbles is reduced, the volume of the reactor is more effectively used for the polymerization and the "dead" volume is reduced. Second, the absence of large bubbles reduces the entrainment of fines from the reactor. Instead, the polymer that is carried out of the reactor with the fluidization gas represents the total polymer within the reactor. Therefore, it is possible to separate the polymer from the fluidization gas, for instance by using a cyclone, and withdraw this polymer as the product or direct it into further polymerization stages. In addition to that, the separated solids can be recycled back to the fludized be reactor. Third, even though polymer particles are entrained from the reactor together with the fluidization gas, the polymer is surprisingly easier to separate from the fluidization gas than if the amount of polymer were smaller. Fourth, the polymer particles obtained from the reactor with the fluidization gas surprisingly contain a minimized fraction of fines. Therefore, when the fluidization gas withdrawn from the top of the reactor is passed through a cyclone the resulting overhead stream surprisingly contains a smaller amount of polymer particles than in a conventional fluidized bed reactor equipped with a similar cyclone. Thus the reactor assemblies and the processes according to the present invention combine a fluidized bed reactor and means for separation of solids/gas in a synergistic way. Furthermore, the underflow stream has better flow properties and is less prone for plugging than in a similar conventional process.

The fluidization gas is withdrawn from the upper zone of the fluidized bed reactor. For withdrawal of the fluidization gas one or more outlets are provided in the upper zone, more preferably, these one or more outlets are located at a height of more than 90% of the total height of the fluidized bed reactor.

Furthermore, the one or more outlets are preferably located in the upper zone all at the same height or all at different heights or a combination of both on the fluidized bed reactor.

Preferably, at least one of the one or more outlets is/are located at a height of more than 95% of the total height of the fluidized bed reactor.

More preferably one outlet is located at the highest port of the reactor and the other outlets, if present, are located at a height of more than 90% of the total height of the fluidized bed reactor, even more preferably one outlet is located at the highest port of the reactor and the other outlets, if present, are located at a height of more than 95% of the total height of the fluidized bed reactor and most preferably, only one outlet for withdrawal of fluidization gas is present in the upper zone of the fluidized bed reactor and is located at the highest port of the reactor.

The one or more outlets are connected to one or more outlet lines. The outlet lines convey the fluidization gas stream to the gas/solid separation means comprising one or more gas/solid separation units. The number of outlets can, but need not equal the number of gas/solid separation units. For instance, when some or all of the more outlet lines are merged fluidization gas from a certain number of outlets can be conveyed to a minor number of gas/solid separation unit. Preferably, only one gas/solid separation unit is present in the gas/solid separation means.

Furthermore, the one or more gas/solid separation units are preferably one or more cyclones. More preferably only one cyclone is present in the gas/solid separation means.

As already outlined above, the one or more outlets in the upper zone of the reactor are connected to one or more outlet lines. The outlet lines convey the fluidization gas stream (34) to the gas/solid separation means comprising one or more gas/solid separation units. Hence, in case one or more outlets in the upper zone of the reactor are present and connected to one or more outlet lines the entirety of streams conveyed through the one or more outlet lines is the fluidization gas stream (34).

From the gas/solids separation means an overhead stream and solid recycling stream is taken. The overhead stream contains less solids by weight than the solid recycling stream.

Preferably, the overhead stream contains less than 5.0% by weight, more preferably less than 3.0% and even more preferably less than 1.0% by weight, even more preferably less than 0.75% and most preferably less than 0.5% by weight of solids. Preferably, the gas amount in the overhead stream is more than 95.0%, more preferably more than 97.0%, even more preferably more than 99.0% even more preferably more than 99.25% and most preferably more than 99.5% by weight.

The solid recycling stream (36), typically contains mainly solid material and includes some gas between the particles. Accordingly the solid recycling stream contains the majority of the mass of the polymer particles that were entrained from the fluidized bed reactor with the fluidization gas stream (34) Typically the solid recycling stream (36) contains at least 75%, preferably 80% and more preferably 85% by weight solids and only at most 25%, preferably 20% and most preferably 15% by weight gas.

As discussed above, the gas/solid separation means may comprise one or more gas/solid separation units.

In case the gas/solid separation means contain only one gas/solid separation unit the unit overhead stream is identical to the overhead stream and the unit solid recycling stream is identical to the solid recycling stream.

From each gas/solid separation unit a unit overhead stream and a unit solid recycling stream is obtained.

In case of the gas/solid separation unit being a cyclone the unit overhead stream is taken from the top outlet of the cyclone and the unit solid recycling stream, is the underflow of the cyclone taken from the bottom outlet of the cyclone.

In case two or more gas/solid separation units are present, these gas/solid separation units may be either arranged in parallel or series.

In the following preferred variants of a parallel assembly of gas/solid separation unit are provided.

In a parallel assembly, usually and preferably, the unit overhead stream of each gas/solid separation unit contains less than 5.0% by weight, more preferably less than 3.0% and even more preferably less than 1.0% by weight, even more preferably less than 0.75% and most preferably less than 0.5% by weight of solids. Preferably, the gas amount in the unit overhead stream of each gas/solid separation unit is more than 95.0%, more preferably more than 97.0%, even more preferably more than 99.0% even more preferably more than 99.25% and most preferably more than 99.5% by weight.

In a parallel assembly, usually and preferably, the unit solid recycling stream contains mainly solid material and includes some gas between the particles.

Accordingly the unit solid recycling stream contains the majority of the mass of the polymer particles that were entrained from the fluidized bed reactor with the fluidization gas stream (34) Typically the unit solid recycling stream contains at least 75%, preferably 80% and more preferably 85% by weight solids and only at most 25%, preferably 20% and most preferably 15% by weight gas.

As already outlined above, the one or more outlets in the upper zone of the reactor are connected to one or more outlet lines. The outlet lines convey the fluidization gas stream (34) to the gas/solid separation means comprising one or more gas/solid separation units.

In a first and preferred variant of the case wherein the gas/solid separation units are arranged in parallel, and only one outlet line which conveys the fluidization gas stream (34) to the gas/solid separation means as mentioned in the foregoing paragraph is present, or the streams of all outlet lines as mentioned in the foregoing paragraph are combined prior to being fed to the gas/solid separation means; the fluidization gas stream (34) is split and a portion thereof is fed to each gas/solid separation unit. In this regard portion denotes a part of the whole which does not differ in its physical properties from another portion. As mentioned above, preferably only one outlet line for conveying the fluidization gas stream (34) is present. Hence, in the first and preferred variant of the case wherein the gas/solid separation units are arranged in parallel preferably only one outlet line which conveys the fluidization gas stream (34) to the gas/solid separation means as mentioned in the foregoing paragraph is present and the fluidization gas stream (34) is split and a portion thereof is fed to each gas/solid separation unit.

In this variant the splitting or combination and subsequent splitting of the streams in the outlet line(s) such that the gas/solid separation is effected in more than one gas/solid separation unit allows the usage of smaller gas/solid separation units. Furthermore, in case one gas/solid separation unit fails it is not necessary to completely stop the process but replacement of gas/solid separation unit during operation is possible.

Furthermore, in case two or more outlets in the upper zone of the reactor are present at different heights the respective streams withdrawn usually have a different composition allowing for fine-tuning of the fluidisation gas stream (34). Thus, optionally, valves are present in each outlet line.

In a second variant of the case wherein the gas/solid separation units are arranged in parallel and two or more outlet lines which convey the fluidization gas stream (34) to the gas/solid separation means are present each of said outlet lines maybe connected to a different gas/solid separation unit. Although not being preferable, it is also possible that the stream in each outlet line is further split into two or more streams and each individual stream is fed to a different gas/solid separation unit or in case more than two outlet lines are present instead of being further split, the streams of two outlet lines may also be combined and fed to a gas/solid separation unit.

In case of a parallel arrangement of the gas/solid separation units according to each of the above variants usually the unit overhead streams of all gas/solid separation units are combined prior to further treatment, e.g. in the solid filter means (41). Hence, the combination is the overhead stream (42) obtained from the gas/solid separation means.

Similarly, the unit solid recycling streams of all gas/solid separation units in case of a parallel arrangement of the gas/solid separation units are preferably combined prior to any further treatment such as introduction into the flow through device, as further described below. Although less preferred the unit solid recycling streams of the gas/solid separation units in case of a parallel arrangement of the gas/solid separation units may also be introduced into individual flow through devices and the streams obtained from each flow through device are combined.

More preferably, in case of a parallel arrangement of the gas/solid separation units according to each of the above variants the unit overhead streams of all gas/solid separation units are combined prior to further treatment, e.g. in the solid filter means (41), thereby forming the overhead stream obtained from the gas/solid separation means; and the unit solid recycling streams of all the gas/solid separation units are combined prior to introduction into the flow through device, thereby forming the solid recycling stream obtained from the gas/solid separation means.

Even more preferably, in case of a parallel arrangement of the gas/solid separation units according to each of the above variants only one outlet for withdrawal of fluidization gas is present in the upper zone of the fluidized bed reactor and is located at the highest port of the reactor and the unit overhead streams of all gas/solid separation units are combined prior to further treatment, e.g. in the solid filter means (41), thereby forming the overhead stream obtained from the gas/solid separation means; and the unit solid recycling streams of all the gas/solid separation units are combined prior to introduction into the flow through device, thereby forming the solid recycling stream obtained from the gas/solid separation means.

Alternatively, the gas/solid separation units are connected in series.

In the following preferred variants in case the gas/solid separation units are arranged in series are described.

In a serial assembly, usually and preferably, the unit overhead stream of each gas/solid separation unit contains less than 5.0% by weight, more preferably less than 3.0% and even more preferably less than 1.0% by weight, even more preferably less than 0.75% and most preferably less than 0.5% by weight of solids. Preferably, the gas amount in the unit overhead stream of each gas/solid separation unit is more than 95.0%, more preferably more than 97.0%, even more preferably more than 99.0% even more preferably more than 99.25% and most preferably more than 99.5% by weight.

In a serial assembly, usually and preferably, the unit solid recycling stream contains mainly solid material and includes some gas between the particles. Accordingly the unit solid recycling stream contains the majority of the mass of the polymer particles that were entrained from the fluidized bed reactor with the fluidization gas stream (34) Typically the unit solid recycling stream contains at least 75%, preferably 80% and more preferably 85% by weight solids and only at most 25%, preferably 20% and most preferably 15% by weight gas.

As already outlined above, the one or more outlets in the upper zone of the reactor are connected to one or more outlet lines. The outlet lines convey the fluidization gas stream (34) to the gas/solid separation means comprising one or more gas/solid separation units.

In case more than one line is present, the streams are combined to form the fluidization gas stream (34).

The fluidization gas stream (34) is fed to a first gas/solid separation unit.

This first unit overhead stream obtained from the first gas/solid separation unit is fed to a second gas/solid separation unit. The unit overhead stream of the second gas/solid separation unit is the overhead stream of the gas/solid separation means.

The unit solid recycling streams obtained from the first and the second gas/solid separation units are preferably combined prior to any further treatment such as introduction into the flow through device, thereby forming the solid recycling stream obtained from the gas/solid separation means. Although less preferable, it is also possible to introduce the first unit solid recycling stream and the second unit recycling stream into separate flow through devices and combine the streams obtained therefrom.

It is also possible to arrange three gas/solid separation units in series whereby the inlet of the second and third gas/solid separation unit is connected to the outlet of the unit overhead stream of the respective upstream gas/solid separation unit. In this variant the unit overhead stream of the third gas/solid separation unit is the overhead stream of the gas/solid separation means. In this variant the unit solid recycling streams obtained from the first, second and third gas/solid separation units are preferably combined prior to introduction into the flow through device, thereby forming the solid recycling stream obtained from the gas/solid separation means.

In such a serial arrangement the unit overhead stream obtained from the first gas/solid separation unit is subjected to further gas/solid separation steps.

Such an arrangement may be used in case a high amount of fines is generated due to the nature of the polymer produced.

Of course combinations of serial and parallel arrangements are also possible. Preferably, the gas/solid separation means contain only one gas/solid separation unit;
   or
   two or more gas/solid separation units whereby all gas/solid separation units are arranged in parallel;
   more preferably, the gas/solid separation means contain
   only one gas/solid separation unit;
   or
   two or more gas/solid separation units whereby all gas/solid separation units are arranged in parallel and wherein
      the unit solid recycling streams of all gas/solid separation units are combined to form the solid recycling stream of the gas/solid separation means prior to any further treatment such as introduction into the flow through device; and
      the unit overhead streams of all gas/solid separation units are combined to form the overhead stream of the gas/solid separation means prior to any further treatment such as introduction into the optional solid filter means (41)

and most preferably, the gas/solid separation means contain only one gas/solid separation unit.

As already outlined above, in case the gas/solid separation means contain only one gas/solid separation unit the unit overhead stream is identical to the overhead stream and the unit solid recycling stream is identical to the solid recycling stream.

As discussed above, the gas/solid separation is conveniently performed by cyclones. Hence, the gas/solid separation units are preferably cyclones.

When a cyclone is used, the unit overhead stream is taken from the top outlet of the cyclone and the unit solid recycling stream, i.e. the underflow of the cyclone, is taken from the bottom outlet of the cyclone.

In a cyclone a gas stream containing solids enters a cylindrical or conical chamber tangentially at one or more points. The gas leaves as unit overhead stream or, in case only one cyclone is present in the gas/solid separation means leaves as overhead stream (42) through a central opening at the top, top outlet, of the cyclone chamber and the solids as unit solid recycling stream (underflow) through an opening at the bottom, bottom outlet, of the cyclone chamber. The solids are forced by inertia towards the walls of the cyclone from where they fall downwards.

In the present invention the stream of solids from the bottom outlet of the cyclone is the unit solid recycling stream or, in case only one cyclone is present in the gas/solid separation means the solid recycling stream (36).

In the present invention the gas circulation line (38) runs from the top outlet of the gas/solid separation means (2) to the inlet for fluidization gas (8), Thus, in the gas circulation line (38) further devices such as solid filter means (41), means for cooling (3), means for pressurizing (4) etc. may be present.

The solid recycling stream is recycled via a solid recycling line, gas/solid separation means to the solid recycling inlet back to the fluidized bed reactor.

The solid recycling line includes a flow through device.

As already outlined above, the flow through device (29) allows for varying the amount of a stream of particles, gas or fluid or mixtures thereof flowing through the device. The variation occurs by adjusting the flow through device. Thereby the flow through device lets pass 0 to 100% of a stream in a certain direction. Furthermore, the flow through device may additionally allow for passing the rest 100 to 0% of the stream in at least one additional direction.

The flow through device (29) in the solid recycling line supplies 0 to 100%, preferably 10 to 90%, more preferably 10 to 60% of the solid recycling stream (36) upstream of the flow through device to the fluidized bed reactor based on the volume of the solid recycling stream (36) upstream of the flow through device.

Furthermore, the flow through device (29) may additionally allow for branching off from the solid recycling stream (36) entering the flow through device a stream to downstream process stages (40) directed to down stream process stages through the line to downstream process stages (39). It is possible to branch off up to 100% of the volume of the solid recycling stream (36) upstream of the flow through device to the stream to downstream process stages (40).

Accordingly the stream to downstream process stages (40) is 100 to 0%, preferably 90 to 10%, more preferably 90 to 40% based on the volume of the solid recycling stream (36) upstream of the flow through device.

Accordingly, the remaining solid recycling stream (36) downstream of the flow through device (29) corresponds to the difference of the solid recycling stream (36) upstream of the flow through device minus the stream to downstream process stages (40).

The relation between the solid recycling stream downstream of the flow through device (29) and the at least one further stream is described by ratio of the flow rate of the solid recycling stream downstream of the flow through device (29) to the flow rate of the at least one further stream based on the volume of the streams.

The control of the volume of the solid recycling stream downstream of the flow through device (29) with respect to the solid recycling stream upstream of the flow through device (29) may be effected by routing 100% of the solid recycling stream upstream of the flow through device (29) to the fluidized bed reactor for a fraction of the total time of the polymerization process and the remaining time to other stream(s), e.g. the stream to downstream process stages (40). In such a case the fractions of time are usually chosen to obtain the above relations between the flow rate of the solid recycling stream downstream of the flow through device to the flow rate of the at least one further stream based on the volume of the streams.

This is explained by the following non-limiting example.

Over a period of ten minutes of continuous polymerization where 90% of the volume of the solid recycling stream upstream of the flow through device (29) should be routed to the fluidized bed reactor, then for nine minutes 100% of the volume of the solid recycling stream upstream of the flow through device (29) is routed to the fluidized bed reactor and for the remaining one minute 100% of the volume of the solid recycling stream upstream of the flow through device (29) is routed to other stream(s), such as the stream to downstream process stages (40).

However, preferably, the flow through device allows for simultaneously supplying a part of the volume of the solid recycling stream upstream of the flow through device (29) to the fluidized bed reactor and to other stream(s), such as the stream to downstream process stages (40). Nevertheless during the process the amount fed to each stream (=split) may be adjusted by the controller.

In such a case the fractions of time and split are usually chosen to obtain the above relations between the flow rate of the solid recycling stream downstream of the flow through device to the flow rate of the at least one further stream based on the volume of the streams.

The flow through device preferably comprises a valve.

One alternative of a flow through device is a multiport valve. Such a multiport valve usually contains at least three connections and at least two settings.

These two settings can be on/off, i.e. either 100% of the volume of the solid recycling stream (36) upstream of the flow through device is routed to the fluidized bed reactor or 0% of the volume of the solid recycling stream (36) upstream of the flow through device is routed to the fluidized bed reactor.

In case 0% of the volume of the solid recycling stream (36) upstream of the flow through device is routed to the fluidized bed reactor the remaining 100% are routed to the line to downstream process stages (39) to downstream process stages (40).

An example of a valve having on/off settings is a three-way ball valve of L-type.

These two settings can also be 90/10 and 10/90, i.e. either 90% of the volume of the solid recycling stream (36) upstream of the flow through device is routed to the fluidized bed reactor and 10% of the volume of the solid recycling stream (36) upstream of the flow through device is routed to the stream to downstream process stages (40) or 10% of the volume of the solid recycling stream (36) upstream of the flow through device is routed to the fluidized bed reactor and 90% of the volume of the solid recycling stream (36) upstream of the flow through device is routed to the line to downstream process stages (39) to downstream process stages (40).

Alternative setting may be 60/40 and 10/90 or 60/40 and 40/60.

The multiport valve may also have more than two settings, e.g. 90/10; 60/40; 40/60 and 10/90.

Alternatively the multiport valve may allow for supplying a variable percentage of the volume of the solid recycling stream (36) upstream of the flow through device to the fluidized bed reactor. Hence, the regulation of the volume of the solid recycling stream to the fluidized bed reactor is not stepwise but can be continuous between 0 and 100% with respect to the volume of the solid recycling stream upstream of the flow through device.

Another alternative of the flow through device used in the present invention comprises a simple branch point having one inlet and at least two outlets, preferably the simple branch point is having one inlet and two outlets.

In a first variant of said alternative the line to downstream process stages (39) is connected to one of the outlets of the simple branch point and a line $L_A$ is connected to a different outlet of the simple branch point, the line $L_A$ is connected to the inlet of a control valve and the outlet of the control valve is connected to the fluidized bed reactor. This stream downstream of the control valve ist the solid recycling stream (36) downstream of the flow through device.

By adjusting the flow through the control valve automatically, the flow through the line to downstream process stages (39) is also adjusted.

In a second variant of said alternative the solid recycling line (36) downstream of the flow through device is connected to one of the outlets of the simple branch point and a line $L_B$ is connected to a different outlet of the simple branch point, the line $L_B$ is connected to the inlet of a control valve and the outlet of the control valve is connected to the line to downstream process stages (39).

In a third variant of said alternative
  a line $L_A$ is connected to an outlet of the simple branch point, the line $L_A$ is connected to the inlet of a first control valve and the outlet of the first control valve is connected to the fluidized bed reactor. This stream downstream of the first control valve ist the solid recycling stream (36) downstream of the flow through device;
  a line $L_B$ is connected to a different outlet of the simple branch point, the line $L_B$ is connected to the inlet of a second control valve and the outlet of the second control valve is connected to the line to downstream process stages (39).

In case two outlets are present in any of the above three variants, the simple branch point may be replaced by a three-way ball valve of T-type which allows one inlet to be connected with either one or both of the outlets. Thereby the settings 0/100 and 100/0 can be effected directly at the branch.

More preferably, the flow through device is either a one-way valve or a multiport valve. The multiport valve contains at least three connections and at least two settings. The at least two settings are not absolute. The least two settings merge, thereby providing intermediate positions allowing the outflow of at least two solid recycling streams having the same or different amounts.

Preferably the multiport valve is a 3/2-way valve. The flow through device allows for varying the amount of solid recycling stream flowing trough the device. Thereby the flow through device lets pass 0 to 100%, preferably 10 to 60%, of solid recycling stream to the fluidized bed reactor. Furthermore, the flow through device may additionally allow for routing the rest 100 to 0%, preferably 90 to 40% of solid recycling stream to down stream process stages.

It is possible to introduce a gas stream into the solid recycling stream (36) and to the solid stream to downstream process stages (40) to facilitate the transport of the powder. The gas stream may consist of inert gases, such as nitrogen or saturated hydrocarbons, such as ethane, propane, butanes, pentanes and the like. It may, however, also comprise or consist of the fluidization gas or comprise one or more components forming the fluidization gas together with one or more inert gases.

Preferably the adjusting of the flow through device occurs via a controller.

Downstream process stages are further process or reaction steps. Preferably, downstream process stages comprise at least the steps of mixing the polymer with additives and extruding the polymer comprising the additives into pellets. They may also comprise a further reactor, means for cooling, means for pressurizing and/or one or more outlets for the polymer. Preferably such further reactor is a moving bed reactor allowing for a dual reactor assembly. Dual reactor assemblies in general are well-known in the art.

The polymer stream withdrawn from the fluidized bed reactor (1) via outlet of the polymer (14) and the solid recycling stream branched off to the output of the polymer (40) downstream from the flow through device can be combined for product recovery.

Furthermore a controller (31) and the flow through device (29) preferably communicate with each other by sending and receiving one or more signals in at least one direction between the flow through device (29) and the controller (31). Preferably, the one or more signal is only sent by the controller and received by the flow through device. However, it is also possible that the one or more signal is only sent by the flow through device and received by the controller. Preferably, the one or more signal is digital, electric, mechanic, electromagnetic and/or a combination thereof. More preferably the signal is digital. Due to that communication the flow through device (29) is adjusted by the controller (31). As a consequence the flow though device (29) varies and/or routes the solid recycling stream (36) as outlined above.

The controller (31) is a device that receives and/or sends signals to the flow through device as outlined above. Furthermore the controller is a device that can receive data, process the data and send signals to the fluidized bed reactor. Furthermore, preferably the controller is a device that communicates with the fluidized bed reactor. Preferably the controller is a computer. The received data are preferably in digital form. The received data originate in the measurement of the mean particle size and/or the particle size distribution of an fluidization gas stream (34) from the fluidized bed reactor and/or originate in the analysis of the operation conditions in the fluidized bed reactor.

The particle size $d_p$ may be and preferably is measured as follows.

The particle size $d_p$ is measured using a Beckman Coulter LS 200 Laser Diffraction Particle Size Analyser.

The samples were prepared by mixing the polymer powder with isopropyl alcohol to a paste, which is further mixed in an ultra sound bath for 20-30 seconds.

The paste is added to the sample unit of the Coulter instrument which contains isopropyl alcohol. The recommended powder concentration is 8 to 12%. The size of the sample unit is 125 ml.

The analysis is performed according to the computer program of the software LS32, version 3.10.2002 of the instrument. The run length is 60 seconds. The calculation of the results is made by the software. Thereby the particle size distribution is obtained.

From the particle size distribution the characteristics such as the median particle size, different average particle sizes, the variance, the standard deviation, and the span can be calculated.

Mass flow rate of solids may be determined by any method known in the art. These include gravimetric methods and the methods based on Coriolis force.

Weight fraction of solids may be also be determined by using any applicable method, such as by taking samples and separating and weighing the components; or, by determining the density of the stream (for instance, by using Coriolis or radioactive methods), analyzing the gas composition and then calculating the solids content from the measured density of the mixture, calculated density of the gas (calculated from the composition) and the known density of the polymer.

The flow rates can be determined by any method known in the art, such as methods based on Coriolis force; methods based on thermal conductivity; methods based on pressure difference; and others.

Suitable apparatuses for the measurement of the mass flow rate of solids flows are LB442 distributed by Berthold Technologies (radioactive) and Multicor distributed by Schenck AccuRate (Coriolis force).

A suitable apparatus for the measurement of the flow rate is Micro Motion (e.g. Elite Coriolis meter) distributed by Emerson Process Management.

The measurement of the gas composition is also well-known in the art and is usually accomplished by on-line gas chromatography. A suitable apparatus therefor is Maxum of Siemens.

In case the flow rates and the densities of the flows are known (which both can be measured by Coriolis flow meters as already outlined above), as well as the gas composition, the solids content of the flow can be calculated from the densities of the gas which, in turn is calculated from the composition, density of the solid, i.e. the density of the polymer which is known and the density of the mixed stream which has been measured.

Analysis of the operation conditions in the fluidized bed reactor preferably comprises analysis of the parameters concerning fluidization conditions. More preferably the analysis comprises the measurement of the contents of the components of the fluidization gas, such as the contents of monomer, hydrogen, comonomers and eventual inert components, the flow rate of the fluidization gas, the temperature and the pressure of the fluidization gas at various points of the gas circulation line, the temperature and pressure at various levels of the reactor and the contents of solids in the fluidization gas stream.

Preferably, due to communication with the fluidized bed reactor the controller ensures that the operation conditions in the fluidized bed reactor are maintained over the full production period.

Preferably, the controller and the fluidized bed reactor assembly preferably communicate with each other by sending and receiving one or more signals in at least one direction between the fluidized bed reactor and the controller. Preferably, the one or more signal is only sent by the controller and received by the fluidized bed reactor assembly. However, it is also possible that the one or more signal is only sent by the fluidized bed reactor assembly and received by controller. Preferably, the one or more signal is digital, electric, pneumatic, electromagnetic and/or a combination thereof. More preferably the signal is digital.

Preferably, the actual particle cut diameter $d_{50}$, is determined and compared with a predetermined threshold value for the particle cut diameter (thres). As it is known in the art the actual particle cut diameter, $d_{50}$, is the diameter of the particle that has a 50% probability of being collected by the cyclone. The actual particle cut diameter $d_{50}$ can be determined experimentally by collecting solid samples over a given period of time both from the solid recycling stream (36) and the overhead stream (42). The particle size distribution is then determined from the solid samples. Furthermore, the solid concentration of the overhead stream (42) sample is determined. The flow rates of the fluidization gas stream (34) entering the cyclone and of the overhead stream (42) leaving the cyclone are measured as well as the flow rate of the solid recycling stream (36).

Then, the mass flow rate of the solids having a particle diameter $d_p$ in the overhead stream (42) can be obtained from:

$$\dot{m}_{p,g} = w_{p,g} \cdot c_s \cdot Q_g,$$

And the mass flow rate of solids having a particle diameter $d_p$ in the solids recycling stream (36) can be obtained from:

$$\dot{m}_{p,s} = w_{p,s} \cdot \dot{m}_s$$

Wherein $\dot{m}_{p,g}$ is the mass flow rate of the solids with a particle size $d_p$ in the overhead stream (42)

$\dot{m}_{p,s}$ is the mass flow rate of the solids with a particle size $d_p$ in the solid recycling stream (36)

$\dot{m}_s$ is the mass flow rate of all solids contained in the solid recycling stream (36)

$w_{p,g}$ is the weight fraction of solids with a particle size $d_p$ in the solid sample of the overhead stream (42)

$w_{p,s}$ is the weight fraction of solids with a particle size $d_p$ in the solid sample of the solid recycling stream (36)

$c_s$ is the concentration of all solids contained in the overhead stream (42)

$Q_g$ is the volumetric flow rate of the overhead stream (42)

The efficiency $\eta(p)$ for a solid of a particle size $d_p$ being captured is then $$\eta(p) = \frac{m_{p,s}}{m_{p,s} + m_{p,g}}$$

And $d_{50}$ can then be found by fitting the value of $d_{50}$ against $d_p$ and $\eta(p)$ in the following equation:

$$\eta(p) = \frac{1}{1 + \left(\frac{d_{50}}{d_p}\right)^2}$$

The efficiency of the cyclone can then be evaluated by comparing the experimentally obtained actual value of $d_{50}$ to a predetermined upper threshold (thres). If the experimental value $d_{50}$ is higher than the predetermined value (thres), then the efficiency is not at a desired level. Then the return flow of the solid recycling stream (36) into the fluidized bed reactor is increased. In case, a stream to downstream process stages is branched off from the solid recycling stream, the volume of the stream to downstream process stages is thereby concomitantly decreased. Accordingly, the ratio of the flow rate of the solid recycling stream to the flow rate of the stream to downstream process stages is increased based on the volume of the streams.

Alternatively, it is also possible to predetermine lower threshold values to the efficiency $\eta(p)$ and compare them directly with the experimentally determined actual values. If the efficiency is lower than the predetermined value the return flow of the solid recycling stream is increased as discussed above.

The particle size analysis can be done off-line by sieving, or, preferably, by using a particle counter, such as those manufactured and sold by Beckman Coulter and Malvern. Such instruments can be used in-line, where a sample is directed automatically to the analyzer and measured. The data is then sent to the process controller or process computer. Instruments may also be used off-line, so that a sample is taken manually and then analyzed. The data is then manually entered into the process computer or controller.

Usually, the efficiency of gas/solid separation in the gas/solid separation means is higher in case the mass fraction of solids in the fluidization gas stream entering the gas/solid separation means is higher.

Thus, in a further aspect of the invention the efficiency of the gas/solid separation means is estimated by determining the amount of solids entering the gas/solid separation means. If the amount of solids in the fluidization gas stream entering the gas/solid separation means is too low then the flow of polymer in the solids recycling stream is increased. This gradually increases the level of the fluidized bed in the reactor. This in turn increases the flow rate of polymer particles entrained by the fluidization gas, thereby increasing the efficiency of the gas/solid separation means. Furthermore, thereby the mass fraction of fines in the solids contained in the fluidization gas stream is reduced.

In a further aspect of the invention the solid recycling stream (36) is increased when the content of fines, usually deduced from the measured particle size distribution of an fluidization gas stream (34) from the fluidized bed reactor (1) is larger than a predetermined set point for the content of fines.

The variation of the flow of the solid recycling stream back to the fluidized bed reactor is achieved by adjusting the flow through device as outlined above. The adjustment of the flow through device may be effected by a controller.

According to one embodiment of the invention the controller includes a model of the process and thus can predict some process variables. For instance, the controller predicts the mean particle size, span of the particle size distribution and/or the whole particle size distribution of the particles contained in the fluidization gas stream using the data obtained in analyzing the operation conditions in the fluidized bed reactor. As outlined above, these predicted values may then be compared to the measured mean particle size, span of particle size distribution and/or the particle size distribution. Further, also other process variables, such as the content of solids in the fluidization gas, both before and after the cyclone, may be predicted. The predicted values may then be adjusted so that they better fit with the measured values. Methods to do this are well known in control engineering and include, for instance, Extended Kalman Filter and Instrumental Variables.

As discussed above it is preferred that the solid recycling stream is increased when the content of fines according to the measurement of the particle size distribution is larger than the predetermined maximum level. Alternatively, the solid recycling stream may be increased if the solids content in the fluidization gas stream is too low. As discussed above these control actions may be based on measured or predicted values.

Typically the fluidization gas enters into the gas entry zone below the bottom zone of the fluidized fed reactor. In said gas entry zone the gas and eventual polymer or catalyst particles are mixed in turbulent conditions. The velocity of the fluidization gas is such that the eventual catalyst or polymer particles contained therein are transferred into the bottom zone. However, polymer agglomerates, such as lumps or sheets, fall downwards and may be thus removed from the reactor. In a typical embodiment the gas entry zone is a pipe typically having a diameter such that the gas velocity is higher than about 1 m/s, such as from 2 to 70 m/s, preferably from 3 to 60 m/s. It is also possible that the gas entry zone has an increasing diameter in the flow direction so that the gas velocity at the upper part of the gas entry zone is lower than at the bottom part.

In the preferred embodiment discussed above the gas enters from the gas entry zone to the bottom zone. A gas entry zone as a matter of definition shall not be seen as part of the reactor and insofar shall not contribute to the height of the reactor. Within the bottom zone the fluidized bed is formed. The gas velocity is gradually reduced so that at the top of the bottom zone the superficial gas velocity is from about 0.02 m/s to about 0.9 m/s, preferably from 0.05 to about 0.8 m/s and more preferably from about 0.07 to about 0.7 m/s, such as 0.5 m/s or 0.3 m/s or 0.2 m/s or 0.1 m/s, Further, usually, in the above-mentioned preferred embodiment the superficial velocity of the fluidization gas decreases in the bottom zone preferably so that the value of a, which is the reciprocal of the square root of the superficial velocity, expressed in m/s, $$a = \frac{1}{\sqrt{v}},$$

wherein v is the superficial velocity of the fluidization gas, increases by a value within the range of from 0.66 to 4.4 per one meter length of the bottom zone. More preferably the value of a as defined above increases by a value within the range of from 0.94 to 3.6, even more preferably from 1.2 to 2.5 per one meter length of the bottom zone. Naturally, the value of a increases in the direction of the flow of the fluidization gas within the bottom zone, that is, in the upwards direction.

Preferably the superficial velocity of the fluidization gas monotonously decreases within the bottom zone, remains at a constant level within the middle zone and monotonously increases within the upper zone. Especially preferably, the superficial velocity increases as described above.

From a process perspective, the middle zone of the fluidized bed reactor is maintained under conditions such that the superficial gas velocity is from 5 to 80 cm/s, preferably 10 to 70 cm/s.

The polymerization catalyst can be fed directly or can originate from a previous prepolymerization stage, the later being preferred. The polymerization catalyst is preferably introduced into the middle zone via the respective inlet. The withdrawal of the reaction product is preferably continuous such as disclosed in WO-A-00/29452.

In a preferred embodiment according to the present invention the reactor assembly according to the present invention further comprising a loop reactor upstream of said fluidized bed reactor.

In the following the methods according to the present invention are further described. The preferred ranges, definitions and dimensions as discussed above with respect to the reactor also apply for the processes and methods and are incorporated by reference herewith.

Furthermore, preferably, the methods according to the present invention are carried out in the reactor assembly according to the present invention including all preferred embodiments thereof.

In the following the use according to the present invention is further described. The preferred ranges, definitions and dimensions as discussed above with respect to the reactor also apply for the use and are incorporated by reference herewith.

Furthermore, preferably, the uses according to the present invention are carried out in the reactor assembly according to the present invention including all preferred embodiments thereof.

Furthermore, the present invention relates to the use of a controller (31), a flow through device (29) and a solid recycling line (35) in a reactor assembly for the production of polymers for minimizing the amount of fines produced by a fluidized bed reactor (1), the reactor assembly including a fluidized bed reactor comprising a bottom zone (5), a middle zone (6) and an upper zone (7), one or more outlets (9) for fluidization gas streams (34) located in the upper zone (7), gas/solid separation means (2), a flow through device (29), a solid recycling line (35), a solid recycling inlet (37), a gas circulation line (38), an inlet (8) for fluidization gas located in the bottom zone (5) and a controller (31).

In the following the processes according to the present invention are further described. The preferred ranges, and dimensions as discussed above with respect to the reactor also apply for the processes and are incorporated by reference herewith.

Furthermore, preferably, the processes according to the present invention are carried out in the reactor assembly according to the present invention including all preferred embodiments thereof.

The present invention relates to a process for the production of polymers in the presence of a polymerization catalyst in a reactor assembly including a fluidized bed reactor as described above. The processes according to the present invention preferably concern the polymerization of polyolefins. More preferably the polyolefins are momoners selected from the group of ethylene, propylene, and $C_4$ to $C_{12}$ alpha olefins.

Figure 1:
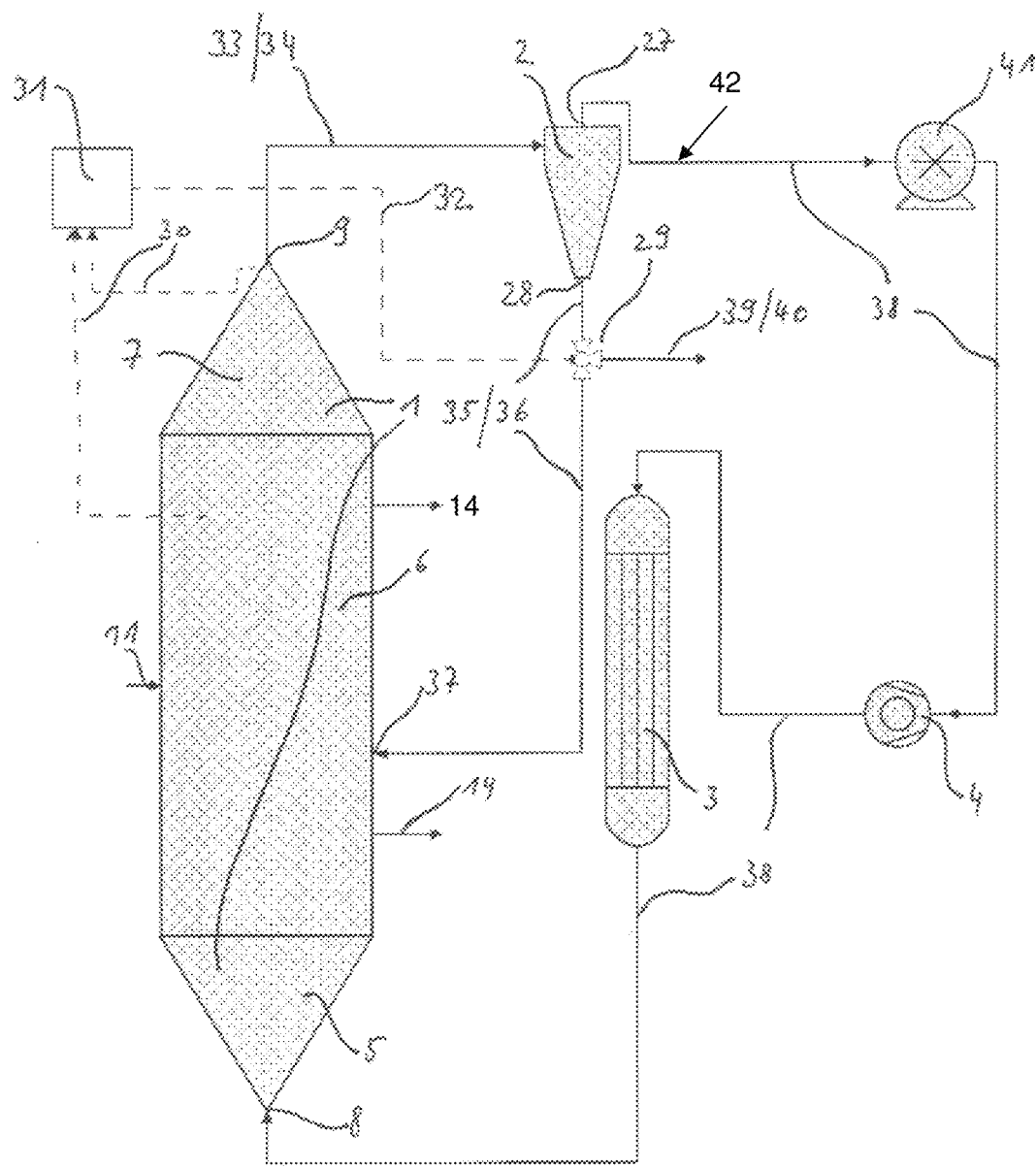
FIG. 1 is a sectional drawing of the reactor assembly including a fluidized bed reactor.
Figure 2:
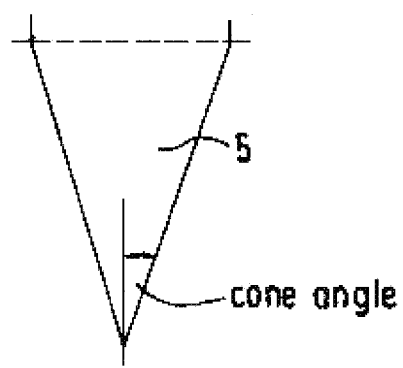
FIG. 2 is a sectional drawing of the cone shaped bottom zone. The cone-angle being the angle between the axis of the cone and the lateral surface is shown.
Figure 3:
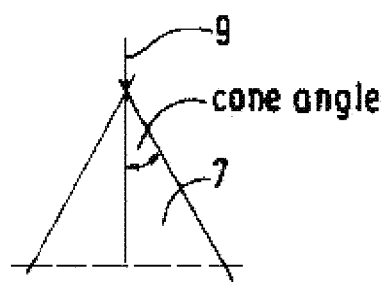
FIG. 3 is a sectional drawing of the cone shaped upper zone.

REFERENCE LIST 1 fluidized bed reactor
2 gas/solid separation means
3 means for cooling
4 means for pressurizing
5 bottom zone
6 middle zone
7 upper zone
8 inlet (for fluidization gas)
9 outlet for fluidization gas stream (34)
10 line for the recycling of solids
11 inlet for catalyst or prepolymer
12 outlet for sheets, chunks, and lumps
13 means for break-up of sheets
14 outlets for the polymer in the middle zone
27 top outlet for overhead stream (42)
28 bottom outlet for stream of solids
29 flow through device
30 data
31 controller
32 signal
33 outlet line
34 fluidization gas stream
35 solid recycling line
36 solid recycling stream
37 solid recycling inlet
38 gas circulation line
39 line to downstream process stages and/or output for polymer
40 stream to downstream process stages and/or output for polymer
41 solid filter means
42 overhead stream
43 first gas/solid separation unit
44 second gas/solid separation unit
45 unit bottom outlets of the first and second gas/solid separation unit
46 unit bottom streams of the first and second gas/solid separation unit
47 unit overhead stream of the first gas/solid separation unit
48 top outlet for the unit overhead stream of the first gas/solid separation unit

DETAILED DESCRIPTION WITH RESPECT TO THE DRAWINGS

The invention shall now be explained with respect to the drawings.

According to FIG. 1 the reactor assembly according to the present invention comprises a fluidized bed reactor (1) having a bottom zone (5), a middle zone (6) and an upper zone (7), The bottom zone (5) and the middle zone (6) (and also the upper zone (7)) form an unobstructed passageway as there is no distribution plate.

Furthermore, the equivalent cross-sectional diameter of the bottom zone (5) being monotonically increasing with respect to the flow direction of the fluidization gas through the fluidized bed reactor; and The one or more outlets (9) in the upper zone (7) of fluidized bed reactor (1) are connected with one or more outlet lines (33) for conveying the fluidization gas stream (34) to gas/solid separation means (2). The gas/solids separation means (2) comprise two outlets, one top outlet (27) and one bottom outlet (28). The fluidization gas exits the top outlet (27) as overhead stream (42).

The overhead stream (42) is conducted via gas circulation line (38) to the inlet (8) in the bottom zone (5) of the fluidized bed reactor (1) whereby a fluidization gas circuit is established. The gas circulation line (38) includes means for pressurizing (4) and means for cooling (3) of the gas. Optionally, the gas circulation line (38) further includes solid filter means (41) for further reducing the amount of solids and especially fines still contained in the fluidization gas stream. These solid filter means (41) are located upstream from the means for pressurizing (4) and means for cooling (3).

The solid recycling stream (36) mainly containing solids exits the gas/solids separation means (2) by the bottom outlet (28). The solid recycling stream (36) is conveyed via solid recycling line (35) to the solid recycling inlet (37) in the middle zone (6) of the fluidized bed reactor (1) whereby a solid circuit is established. The solid recycling line (35) includes a flow through device (29). The flow though device (29) varies the solid recycling stream (36), whereby the whole solid recycling stream (36) or only a part of it is delivered to the fluidized bed reactor (1). Moreover, if the operating conditions in the fluidized gas reactor are such that more or less no fines are produced, the flow through device (29) may be fully closed such that there is no recycling taking place.

Furthermore, by the flow through device (29) a stream to downstream process stages (40) can branched off from the solid recycling stream (36). Therefore, the flow through device (29) can also vary the stream to downstream process stages (40) and/or an outlet. The stream to downstream process stages (40) corresponds to the part of the solid recycling stream (36) not being delivered to the fluidized bed reactor (1).

Furthermore, in the fluidization gas stream (34) at the outlet (9) of the fluidized bed reactor (1) the mean particle size and/or the particle size distribution is measured. Additionally, the operation condition inside the fluidized bed reactor (1) are analyzed. Analysis typically includes the measurement of the fluidization velocity, $u_f$, and/or comonomer concentration, $C_c$.

The obtained data (30) regarding particle size and operation condition are sent to a controller (31). The data (30) are processed by a controller (31). The controller (31) and the flow through device (29) communicate with each other by sending one or more signals in at least one direction between the flow through device (29) and the controller (31). Due to that communication the flow through device (29) is adjusted by the controller (31), whereby the flow though device (29) varies in the following at least the solid recycling stream (36) back to the fluidized bed reactor (1) as outlined above.

Figure 4:
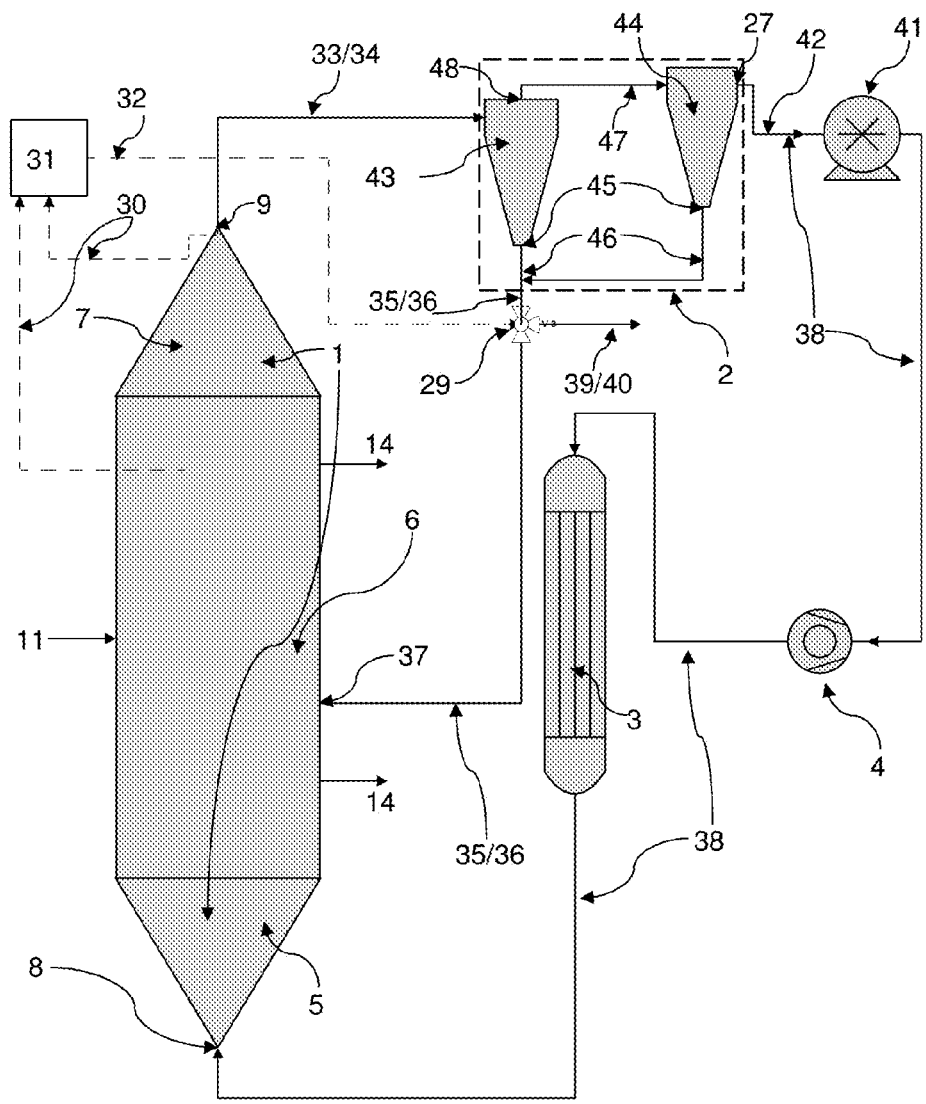
FIG. 4 is sectional drawing of the reactor assembly including a fluidized bed reactor and two gas/solid separation units connected in series in the gas/solid separation means.

The reactor assembly according to FIG. 4 is a modification of the reactor assembly according to FIG. 1.

The gas/solid separation means (2) shown by the dotted rectangle contain a first gas/solid separation unit (43) and a second gas/solid separation unit (44). The first gas/solid separation unit (43) has a top outlet (48) for the unit overhead stream of first gas/solid separation unit (47). The unit overhead stream of first gas/solid separation unit (47) is fed to the second gas/solid separation unit (44). The unit overhead stream of the second gas/solid separation unit obtained through outlet (27) is the overhead stream (42).

The unit solid recycling streams (46) obtained through outlets (45) are combined. These combined streams are the solid recycling stream (36) obtained in solid recycling line (35).

EXAMPLES

Example 1 (Comparative)

The invention was exemplified with a reactor made of steel having the following dimensions:
Height of the bottom zone: 1680 mm
Diameter at the bottom of the bottom zone: 175 mm
Height of the middle zone: 2050 mm
Height of the upper zone: 670 mm
Diameter of the middle zone: 770 mm The operation of the reactor was stable and without problems.

The reactor described above was used for copolymerization of ethylene and 1-butene at a temperature of 80° C. and a pressure of 20 bar. The height of the fluidized bed, calculated from the bottom of the middle zone was 2100 mm.

Ethylene homopolymer ($MFR_2$=300 g/10 min, density 974 kg/m$^3$) produced in a loop reactor and still containing the active catalyst which one dispersed therein was introduced into the above reactor via an inlet located in the bottom zone at a rate of 40 kg/h. Ethylene, hydrogen and 1-butene were continuously introduced into the circulation gas line so that the ethylene concentration in the fluidization gas was 17% by mole, the ratio of 1-butene to ethylene was 100 mol/kmol and the ratio of hydrogen to ethylene was 15 mol/kmol. The reminder of the fluidization gas was nitrogen. The flow rate of the gas was adjusted so that the superficial gas velocity in the middle zone of the reactor was 15 cm/s. The resulting copolymer could be easily withdrawn via an outlet at a rate of 68 kg/h.

The fluidization gas flow was thus 250 m$^3$/h, corresponding to a mass flow rate of 4800 kg/h. The polymer content in the fluidization gas stream withdrawn from the top of the fluidized bed reactor was about 0.25% by weight and thus 12.0 kg/h of polymer was withdrawn together with the fluidization gas. The fluidization gas stream was passed through a cyclone where 11.4 kg/h of the polymer was recovered from the cyclone as a bottom stream while 0.6 kg/h remained with the fluidization gas stream. The entire bottom stream from the cyclone was combined with the product stream withdrawn from the reactor and directed to product recovery where it was mixed with additives and extruded to pellets. The solid recycling stream branched off to the output of the polymer downstream from the flow through device was combined for product recovery with the polymer stream withdrawn from the fluidized bed reactor via outlet of the polymer.

Example 2 (Inventive)

Procedure of Example 1 was repeated. Then, the solid recycling stream withdrawn at the bottom outlet from the cyclone was returned to the fluidized bed reactor. When the reactor was operated in this way the bed level increased in one hour to 2300 mm. At the same time the solids content in the fluidization gas stream increased to 0.4% by weight and 19.2 kg/h of polymer were transported by the fluidization gas stream to the cyclone. The flow of polymer captured from the solid recycling stream at the bottom outlet of the cyclone was 18.9 kg/h and 0.3 kg/h remained in the in the overhead stream of the cyclone. The polymer withdrawal rate from the bed was then lowered to 61 kg/h. After one hour of operation the flows were changed so that the solid recycling stream (36) was 11.5 kg/h, the stream to downstream process stages (40) was 7.5 kg/h and polymer withdrawal stream (14) from the reactor was 72 kg/h. A stable operation was achieved with no problem of fouling in the circulation gas system.

In the Following Clauses Preferred Embodiments of the Invention are Described

1. A reactor assembly for the production of polymers including a fluidized bed reactor (1) comprising a bottom zone (5), a middle zone (6) and an upper zone (7), one or more outlets (9) for fluidization gas streams (34) located in the upper zone (7), gas/solid separation means (2), a flow through device (29), a solid recycling line (35), a solid recycling inlet (37), a gas circulation line (38), an inlet (8) for fluidization gas located in the bottom zone (5); the outlet (9) for the fluidization gas stream (34) being coupled with the fluidized bed reactor (1) via gas/solid separation means (2), gas circulation line (38) and inlet (8) and via solid recycling line (35), gas/solid separation means (2) and solid recycling inlet (37);
the equivalent cross-sectional diameter of the bottom zone (5) being monotonically increasing with respect to the flow direction of the fluidization gas through the fluidized bed reactor (1); and
wherein there is an unobstructed passageway in the direction of flow of the fluidization gas through the fluidized bed reactor from the bottom zone (5) to the upper zone (7),
characterized in that the solid recycling line (35) includes the flow through device (29).
2. The reactor assembly according to any one of the preceeding clauses, wherein said fluidized bed reactor (1) comprises no gas distribution grid and/or plates.
3. The reactor assembly according to any one of the preceeding clauses 2 to 10, wherein the gas solids/separation means (2) are cyclones.
4. Method for operating a reactor assembly for the production of polymers including a fluidized bed reactor (1) comprising a bottom zone (5), a middle zone (6) and an upper zone (7), one or more outlets (9) for fluidization gas streams (34) located in the upper zone (7), gas/solid separation means (2), a flow through device (29), a solid recycling line (35), a solid recycling inlet (37), a gas circulation line (38), an inlet (8) for fluidization gas located in the bottom zone (5) and a controller (31), the method comprising the steps of:
a) measuring the mean particle size and/or the particle size distribution and/or the concentration of all solids of an fluidization gas stream (34) from the fluidized bed reactor (1);
b) analyzing the operation conditions in the fluidized bed reactor (1);
c) sending the data (30) obtained in steps a) and b) to a controller (31);
d) processing the data (30) by the controller (31); and
e) adjusting the flow through device (29) by the controller (31);
whereby the flow through device (29) varies the solid recycling stream (36) via solid recycling line (35) back to the fluidized bed reactor (1).

5. Method according to clause 4, wherein step b) comprises the measurement of fluidization velocity, $u_f$.

6. Method according to clause 4 or 5, furthermore comprising the steps of:
dd) predicting the mean particle size and/or the particle size distribution of the fluidization gas stream (34) using the data obtained in step b);
de) comparing the measured and the predicted mean particle size and/or the particle size distribution of the fluidization gas stream (34) of steps a) and dd).

7. Method according to any of the preceding clauses 4 to 6, whereby the solid recycling stream (36) is increased when the content of fines deduced from the measured particle size distribution of step a) is larger than a predetermined set point for the content of fines.

8. Method according to one of the preceding clauses 4 to 7, wherein the flow through device (29) varies the solid recycling stream (36) back to the fluidized bed reactor (1) and/or allows a stream to downstream process stages (40).

9. Method according to one of the preceding clauses 4 to 8 wherein said fluidization gas is upwards rising fluidization gas and said upwards rising fluidization gas has a superficial velocity in the middle zone (6) of from 0.05 to 0.8 m/s.

10. A method for polymerizing olefins in a fluidized bed reactor (1), wherein the fluidized bed is formed by polymer particles in an upwards rising fluidization gas said upwards rising fluidization gas has a superficial velocity in the middle zone (6) of from 0.05 to 0.8 m/s, said method comprising the steps of:
(i) withdrawing a fluidization gas stream (34) via outlet (9) from said fluidized bed reactor (1) at a height of more than 90% of the total height of said fluidized bed reactor (1);
(ii) separating polymer particles from said fluidization gas stream (34) to produce an overhead stream (42) and a solid recycling stream (36);
(iii) branching off from said solid recycling stream (36) a stream to downstream process stages (40);
(iv) directing said stream to downstream process stages (40) to downstream process stages; and
(v) recycling the solid recycling stream (36) into said fluidized bed reactor (1);
wherein said fluidized bed reactor (1) comprises a bottom zone (5), a middle zone (6) and an upper zone (7), the equivalent cross-sectional diameter of the bottom zone (5) being monotonically increasing with respect to the flow direction of the fluidization gas through the fluidized bed reactor and the equivalent cross-sectional diameter of the upper zone (7) being monotonically decreasing with respect to the flow direction of the fluidization gas through the fluidized bed reactor (1); and wherein there is an unobstructed passageway in the direction of flow of the fluidization gas through the fluidized bed reactor from the bottom zone (5) to the upper zone (7).

11. The method according clause 10, wherein the fluidized bed reactor (1) further comprises one or more outlets (9) for fluidization gas streams (34) located in the upper zone (7).

12. The method according to any one of the preceeding clauses 4 to 11, wherein said fluidized bed reactor (1) comprises no gas distribution grid and/or plates.

13. The method according to any one of the preceeding clauses 4 to 12, wherein the gas solids/separation means (2) are cyclones.

14. Use of a controller (31), a flow through device (29) and a solid recycling line (35) in a reactor assembly for the production of polymers including a fluidized bed reactor (1) comprising a bottom zone (5), a middle zone (6) and an upper zone (7), one or more outlets (9) for fluidization gas streams (34) located in the upper zone (7), gas/solid separation means (2), a solid recycling line (35), a solid recycling inlet (37), a gas circulation line (38), an inlet (8) for fluidization gas located in the bottom zone (5) and an outlet for the polymer (14) for minimizing the mass fraction of fines with respect to the solids contained in the fluidization gas streams (34).

15. Use of a controller (31), a flow through device (29) and a solid recycling line (35) according to clause 14 in a reactor assembly for the production of polymers for minimizing the amount of fines produced by the fluidized bed reactor (1), wherein the minimizing occurs by regulating the amount of fines produced in the fluidized bed reactor (1) by varying the solid recycling stream (36) and/or the operation conditions of the fluidized bed reactor (1).

The invention claimed is:

1. A method for polymerizing olefins in a fluidized bed reactor, wherein a fluidized bed is formed by polymer particles in an upwards rising fluidization gas, said upwards rising fluidization gas has a superficial velocity in a middle zone of from 0.05 to 0.8 m/s, said method comprising the steps of:
(i) withdrawing a fluidization gas stream via an outlet from said fluidized bed reactor at a height of more than 90% of the total height of said fluidized bed reactor;
(ii) separating polymer particles from said fluidization gas stream to produce an overhead stream and a solid recycling stream;
(i) branching off from said solid recycling stream a stream to downstream process stages;
(iv) directing said stream to downstream process stages to downstream process stages; and
(v) recycling the solid recycling stream into said fluidized bed reactor;
wherein said fluidized bed reactor comprises a bottom zone, said middle zone and an upper zone, an equivalent cross-sectional diameter of the bottom zone being monotonically increasing with respect to the flow direction of the fluidization gas through the fluidized bed reactor and an equivalent cross-sectional diameter of the upper zone being monotonically decreasing with respect to the flow direction of the fluidization gas through the fluidized bed reactor; and
wherein there is an unobstructed passageway in the direction of flow of the fluidization gas through the fluidized bed reactor from the bottom zone to the upper zone; and
the reactor further comprises an outlet for the polymer whereby the polymer stream withdrawn from the fluidized bed reactor via outlet of the polymer and the solid recycling stream branched off to the output of the polymer are combined for product recovery; and the reactor further comprising gas/solid separation means, a flow through device, a solid recycling line, a solid recycling inlet, a gas circulation line, an inlet for fluidization gas located in the bottom zone and a controller, the method further comprising the steps of:

a) measuring the mean particle size and/or the particle size distribution and/or the concentration of all solids of an fluidization gas stream from the fluidized bed reactor;

b) analyzing the operation conditions in the fluidized bed reactor;

c) sending the data obtained in steps a) and b) to a controller;

d) processing the data by the controller; and e) adjusting the flow through device by the controller;

whereby the flow through device varies the solid recycling stream via solid recycling line back to the fluidized bed reactor.

2. The method according to claim 1, wherein the fluidized bed reactor further comprises a flow through device, the flow through device branches off from the solid recycling stream entering the flow through device a stream to downstream process stages directed to down stream process stages through the line to downstream process stages.

3. The method according to claim 1, wherein the fluidized bed reactor further comprises one or more outlets for fluidization gas streams located in the upper zone.

4. The method according to claim 1, wherein said fluidized bed reactor comprises no gas distribution grid and/or plates.

5. The method according to claim 1, wherein the gas solids/separation means are cyclones.

6. The method according to claim 1, wherein the outlet of the polymer is located in the middle zone.

7. Method according to claim 1, wherein step b) comprises the measurement of fluidization velocity, $u_f$.

8. Method according to claim 1, furthermore comprising the steps of:

dd) predicting the mean particle size and/or the particle size distribution of the fluidization gas stream using the data obtained in step b);

de) comparing the measured and the predicted mean particle size and/or the particle size distribution of the fluidization gas stream of steps a) and dd).

9. Method according to claim 1, whereby the solid recycling stream is increased when the content of fines deduced from the measured particle size distribution of step a) is larger than a predetermined set point for the content of fines.

10. Method according to claim 1, wherein the flow through device varies the solid recycling stream back to the fluidized bed reactor and/or allows a stream to downstream process stages.

11. Method according to claim 1, wherein said fluidization gas is upwards rising fluidization gas and said upwards rising fluidization gas has a superficial velocity in the middle zone of from 0.05 to 0.8 m/s.

12. A reactor assembly for the production of polymers including a fluidized bed reactor comprising a bottom zone, a middle zone and an upper zone, one or more outlets for fluidization gas streams located in the upper zone, gas/solid separation means, a flow through device, a solid recycling line, a solid recycling inlet, a gas circulation line, an inlet for fluidization gas located in the bottom zone;

the outlet for the fluidization gas stream being coupled with the fluidized bed reactor via a gas/solid separation means, the gas circulation line and the inlet and via the solid recycling line, the gas/solid separation means and the solid recycling inlet;

an equivalent cross-sectional diameter of the bottom zone being strictly monotonically increasing with respect to a flow direction of the fluidization gas through the fluidized bed reactor; and wherein there is an unobstructed passageway in the direction of flow of the fluidization gas through the fluidized bed reactor from the bottom zone to the upper zone, characterized in that the solid recycling line includes the flow through device, wherein the flow through device allows for varying the amount of a stream of particles, gas or fluid or mixtures thereof flowing through the device whereby the variation occurs by adjusting the flow through device and the flow through device lets pass 0 to 100% of a stream in a certain direction and the flow through device allows for passing the rest 100 to 0% of the stream in at least one additional direction, and the gas/solids separation means are cyclones.

13. The reactor assembly according to claim 12, wherein said fluidized bed reactor comprises no gas distribution grid and/or plates.

* * * * *